United States Patent
Wang et al.

(10) Patent No.: US 12,395,905 B2
(45) Date of Patent: Aug. 19, 2025

(54) LISTEN-BEFORE-TALK FAILURE IN A WIRELESS COMMUNICATION NETWORK

(71) Applicant: Telefonaktiebolaget LM Ericsson (publ), Stockholm (SE)

(72) Inventors: Min Wang, Luleå (SE); Muhammad Ali Kazmi, Sundbyberg (SE); Marco Belleschi, Solna (SE); Iana Siomina, Täby (SE); Jan Christoffersson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 393 days.

(21) Appl. No.: 17/917,300

(22) PCT Filed: Apr. 8, 2021

(86) PCT No.: PCT/EP2021/059123
§ 371 (c)(1),
(2) Date: Oct. 6, 2022

(87) PCT Pub. No.: WO2021/204916
PCT Pub. Date: Oct. 14, 2021

(65) Prior Publication Data
US 2023/0089641 A1  Mar. 23, 2023

Related U.S. Application Data

(60) Provisional application No. 63/007,565, filed on Apr. 9, 2020.

(51) Int. Cl.
*H04W 36/00* (2009.01)
*H04W 76/19* (2018.01)
*H04W 74/0808* (2024.01)

(52) U.S. Cl.
CPC ....... *H04W 36/0079* (2018.08); *H04W 76/19* (2018.02); *H04W 74/0808* (2013.01)

(58) Field of Classification Search
CPC ............ H04W 36/0079; H04W 76/19; H04W 74/0808; H04W 76/18; H04W 36/0033;
(Continued)

(56) References Cited

U.S. PATENT DOCUMENTS

2021/0100031 A1* 4/2021 Cirik ..................... H04W 76/19
2021/0321314 A1* 10/2021 Ozturk .............. H04W 74/0808
(Continued)

FOREIGN PATENT DOCUMENTS

WO    WO-2020069114 A1 *  4/2020 ............ H04W 16/14

OTHER PUBLICATIONS

3GPP, "3GPP TS 23.502 V16.4.0", 3rd Generation Partnership Project; Technical Specification Group Services and System Aspects; Procedures for the 5G System (5GS); Stage 2 (Release 16), Mar. 2020, 1-582.
(Continued)

*Primary Examiner* — Mewale A Ambaye
(74) *Attorney, Agent, or Firm* — Sage Patent Group

(57) ABSTRACT

A wireless device is configured for use in a wireless communication network. The wireless device obtains a configuration that governs how the wireless device is to monitor for and/or attempt to recover from consistent uplink listen-before-talk (LBT) failure that occurs during a mobility procedure triggered by the wireless device. According to the obtained configuration, the wireless device monitors for and/or attempts to recover from consistent uplink LBT failure occurring during the mobility procedure.

23 Claims, 18 Drawing Sheets

(58) Field of Classification Search
CPC ..... H04W 76/10; H04W 48/20; H04W 36/00; H04W 74/08
See application file for complete search history.

(56) References Cited

U.S. PATENT DOCUMENTS

| | | | | |
|---|---|---|---|---|
| 2022/0322452 | A1* | 10/2022 | You | H04W 24/02 |
| 2023/0047579 | A1* | 2/2023 | Zhang | H04L 1/1883 |
| 2023/0354425 | A1* | 11/2023 | Jeon | H04L 5/0048 |
| 2024/0121819 | A1* | 4/2024 | Hui | H04W 72/40 |
| 2024/0163905 | A1* | 5/2024 | Rastegardoost | H04W 72/25 |

OTHER PUBLICATIONS

"ETSI EN 300 328 V2.2.1", Wideband transmission systems; Data transmission equipment operating in the 2,4 GHz band; Harmonised Standard for access to radio spectrum, Apr. 2019, 1-101.

3GPP, "3GPP TS 23.501 V16.4.0", 3rd Generation Partnership Project; Technical Specification Group Services and System Aspects; System architecture for the 5G System (5GS); Stage 2 (Release 16), Mar. 2020, 1-430.

3GPP, "3GPP TS 38.300 V16.0.0", 3rd Generation Partnership Project; Technical Specification Group Radio Access Network; NR; NR and NG-RAN Overall Description; Stage 2 (Release 16), Dec. 2019, 1-101.

3GPP, "3GPP TS 38.331 V16.0.0", 3rd Generation Partnership Project; Technical Specification Group Radio Access Network; NR; Radio Resource Control (RRC) protocol specification (Release 16), Mar. 2020, 1-835.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.7.0, Sep. 2019, pp. 1-295.

3GPP, "3rd Generation Partnership Project; Technical Specification Group Radio Access Network; NR; Medium Access Control (MAC) protocol specification (Release 15)", 3GPP TS 38.321 V15.7.0, Sep. 2019, 1-78.

\* cited by examiner

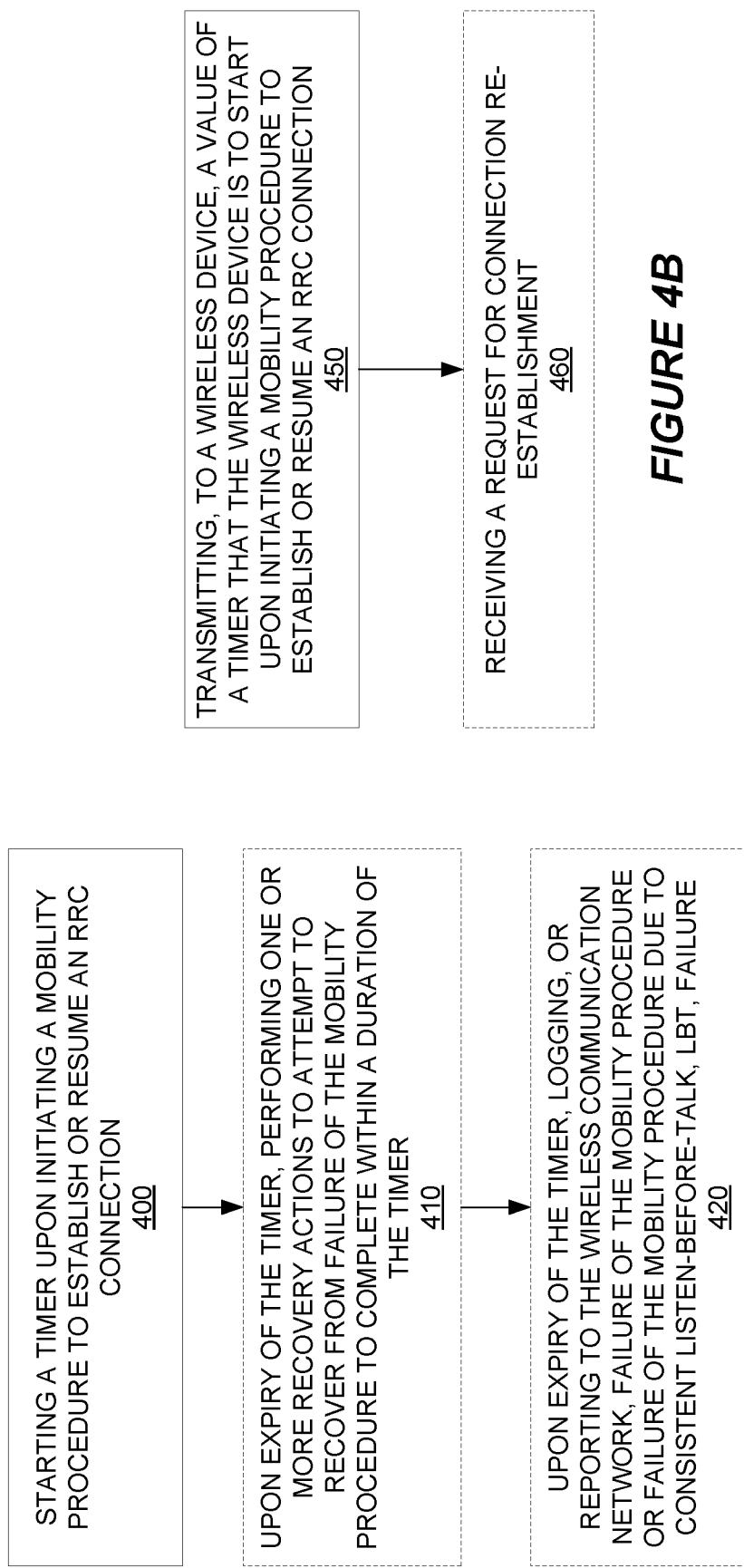

LISTEN-BEFORE-TALK FAILURE IN A WIRELESS COMMUNICATION NETWORK

TECHNICAL FIELD

The present application relates generally to a wireless communication network, and relates more particularly to listen-before-talk failure in such a network.

BACKGROUND

Radio link failure in a wireless communication system is a failure of a radio link at a lower layer of the protocol stack. Once a wireless device considers radio link failure to have been detected, the wireless device may release the radio link and/or attempt to re-establish the radio link from scratch.

A wireless device may consider radio link failure to be detected upon detecting any number of problems which the wireless device monitors in parallel. For example, the wireless device may detect radio link failure if the physical layer indicates a problem (e.g., out-of-sync) to a higher layer a number of times consecutively, and the wireless device fails to recover within a certain time. Or, the wireless device may detect radio link failure if a maximum number of radio link control (RLC) retransmissions is reached. Or, the wireless device may detect radio link failure if a problem occurs with a radio access procedure.

Operation in unlicensed frequency spectrum complicates radio link failure detection. In unlicensed frequency spectrum, a wireless device generally must successfully complete a listen-before-talk (LBT) procedure, e.g., to confirm the spectrum is clear, before being permitted to perform an uplink transmission. Failure of this LBT procedure therefore complicates detection of radio link failure.

SUMMARY

Some embodiments herein configure a wireless device in terms of how the wireless device is to monitor for and/or attempt to recover from consistent uplink Listen-Before-Talk (LBT) failure that occurs during a mobility procedure triggered by the wireless device. Such device-triggered mobility procedure may include for instance cell selection or reselection while the wireless device is in a Radio Resource Control (RRC) idle mode, cell reselection while the wireless device is in RRC inactive mode, or RRC connection re-establishment while the wireless device is in RRC connected mode. Regardless, the wireless device may be configured, for instance, with one or more counters and/or one or more timers that the wireless device is to use for detecting consistent uplink LBT failure occurring during the mobility procedure. The wireless device may alternatively or additionally be configured with one or more cells, or one or more parts of a cell, towards which the wireless device is to attempt the mobility procedure in order to recover from consistent uplink LBT failure detected when attempting the mobility procedure towards a target cell. These and other embodiments may thereby advantageously account for consistent uplink LBT failure even when such failure occurs during a device-triggered mobility procedure.

More particularly, embodiments herein include a method performed by a wireless device configured for use in a wireless communication network. The method comprises obtaining a configuration that governs how the wireless device is to monitor for and/or attempt to recover from consistent uplink listen-before-talk, LBT, failure that occurs during a mobility procedure triggered by the wireless device. The method also comprises, according to the obtained configuration, monitoring for and/or attempting to recover from consistent uplink LBT failure occurring during the mobility procedure.

In some embodiments, the mobility procedure comprises cell selection, or cell reselection, while the wireless device is in a Radio Resource Control, RRC, idle mode. Alternatively or additionally, the mobility procedure comprises cell reselection, while the wireless device is in a Radio Resource Control, RRC, inactive mode. Alternatively or additionally, the mobility procedure comprises RRC connection re-establishment while the wireless device is in an RRC connected mode.

In some embodiments, obtaining the configuration comprises receiving, from a network node, signaling indicating at least a part of the configuration. In one or more of these embodiments, the signaling is received while the wireless device is in RRC idle mode or RRC inactive mode. In one or more other embodiments, the signaling is received while the wireless device is in RRC connected mode. In this case, the method further comprises storing the configuration for use while the wireless device is in RRC idle mode or RRC inactive mode. Alternatively or additionally, the signaling may indicate at least a part of the configuration in system information, or the signaling may comprise cell-common signaling that is commonly sent to multiple wireless devices in a source cell or a target cell of the mobility procedure.

In some embodiments, obtaining the configuration comprises determining at least a part of the configuration from one or more rules. In this case, said determining may be based on a type of the mobility procedure, an RRC state of the wireless device, a capability of the wireless device, and/or a type of a target cell of the mobility procedure.

In some embodiments, the configuration indicates one or more cells, or one or more parts of a cell, towards which the wireless device is to attempt the mobility procedure in order to recover from consistent uplink LBT failure detected when attempting the mobility procedure towards a target cell.

In some embodiments, the configuration indicates one or more counters that the wireless device is to use for detecting consistent uplink LBT failure. Additionally or alternatively, the configuration indicates one or more timers that the wireless device is to use for detecting consistent uplink LBT failure.

In some embodiments, the configuration is specific to an RRC state of the wireless device. Additionally or alternatively, the configuration is specific to a frequency band or range in which the wireless device is operating.

In some embodiments, the method further comprises, responsive to failing to recover from consistent uplink LBT failure, considering radio link failure to be detected. The method in this case may further comprise, responsive to radio link failure being detected, transmitting a request for connection re-establishment, wherein the request indicates a cause of the request for connection re-establishment as being consistent uplink LBT failure.

In some embodiments, the method further comprises reporting, to the wireless communication network, failure of the mobility procedure due to consistent uplink LBT failure.

Other embodiments herein include a method performed by a radio network node configured for use in a wireless communication network. The method comprises transmitting, to a wireless device, signaling indicating at least part of a configuration that governs how the wireless device is to monitor for and/or attempt to recover from consistent uplink listen-before-talk, LBT, failure that occurs during a mobility procedure triggered by the wireless device.

In some embodiments, the mobility procedure comprises cell selection, or cell reselection, while the wireless device is in a Radio Resource Control, RRC, idle mode. Alternatively or additionally, the mobility procedure comprises cell reselection, while the wireless device is in a Radio Resource Control, RRC, inactive mode. Alternatively or additionally, the mobility procedure comprises RRC connection re-establishment while the wireless device is in an RRC connected mode.

In some embodiments, the signaling is transmitted while the wireless device is in RRC idle mode or RRC inactive mode.

In some embodiments, the signaling is transmitted while the wireless device is in RRC connected mode. In this case, the configuration is valid for use while the wireless device is in RRC idle mode or RRC inactive mode.

In some embodiments, the signaling indicates at least a part of the configuration in system information, or the signaling comprises cell-common signaling that is commonly sent to multiple wireless devices in a source cell or a target cell of the mobility procedure.

In some embodiments, the configuration is based on or depends on a type of the mobility procedure, an RRC state of the wireless device, a capability of the wireless device, and/or a type of a target cell of the mobility procedure.

In some embodiments, the configuration indicates one or more cells, or one or more parts of a cell, towards which the wireless device is to attempt the mobility procedure in order to attempt to recover from consistent uplink LBT failure detected when attempting the mobility procedure towards a target cell.

In some embodiments, the configuration indicates one or more counters that the wireless device is to use for detecting consistent uplink LBT failure. Additionally or alternatively, the configuration indicates one or more timers that the wireless device is to use for detecting consistent uplink LBT failure.

In some embodiments, the configuration is specific to an RRC state of the wireless device. Additionally or alternatively, the configuration is specific to a frequency band or range in which the wireless device is operating.

In some embodiments, the method further comprises receiving a request for connection re-establishment. In this case, the request indicates a cause of the request for connection re-establishment as being consistent uplink LBT failure.

In some embodiments, the method further comprises receiving, from the wireless device, a report of failure of the mobility procedure due to consistent uplink LBT failure.

Other embodiments herein include a wireless device configured for use in a wireless communication network. The wireless device is configured to obtain a configuration that governs how the wireless device is to monitor for and/or attempt to recover from consistent uplink listen-before-talk, LBT, failure that occurs during a mobility procedure triggered by the wireless device. The wireless device is also configured to, according to the obtained configuration, monitor for and/or attempt to recover from consistent uplink LBT failure occurring during the mobility procedure.

In some embodiments, the wireless device is configured to perform the steps described above for a wireless device.

Other embodiments herein include a radio network node configured for use in a wireless communication network. The radio network node is configured to transmit, to a wireless device, signaling indicating at least a part of a configuration that governs how the wireless device is to monitor for and/or attempt to recover from consistent uplink listen-before-talk, LBT, failure that occurs during a mobility procedure triggered by the wireless device.

In some embodiments, the radio network node is configured to perform the steps described above for a radio network node.

Other embodiments herein include a computer program comprising instructions which, when executed by at least one processor of a wireless device, causes the wireless device to perform the steps described above for a wireless device. Other embodiments herein include a computer program comprising instructions which, when executed by at least one processor of a radio network node, causes the radio network node to perform the steps described above for a radio network node. In one or more of these embodiments, a carrier containing the computer program described above is one of an electronic signal, optical signal, radio signal, or computer readable storage medium.

Other embodiments herein include a wireless device configured for use in a wireless communication network. The wireless device comprises communication circuitry and processing circuitry. The processing circuitry is configured to obtain a configuration that governs how the wireless device is to monitor for and/or attempt to recover from consistent uplink listen-before-talk, LBT, failure that occurs during a mobility procedure triggered by the wireless device, and according to the obtained configuration, monitor for and/or attempt to recover from consistent uplink LBT failure occurring during the mobility procedure.

In some embodiments, the processing circuitry is configured to perform the steps described above for a wireless device.

Other embodiments herein include a radio network node configured for use in a wireless communication network. The radio network node comprises communication circuitry and processing circuitry. The processing circuitry is configured to transmit, to a wireless device, via the communication circuitry, signaling indicating at least a part of a configuration that governs how the wireless device is to monitor for and/or attempt to recover from consistent uplink listen-before-talk, LBT, failure that occurs during a mobility procedure triggered by the wireless device.

In some embodiments, the processing circuitry is configured to perform the steps described above for a radio network node.

Other embodiments herein include a method performed by a wireless device configured for use in a wireless communication network. The method comprises detecting consistent uplink listen-before-talk, LBT, failure while the wireless device is in a Radio Resource Control, RRC, idle mode or an RRC inactive mode, and when the wireless device is in an RRC connected mode, transmitting to the wireless communication network a report that includes information about the consistent uplink LBT failure detected.

In some embodiments, the information includes a carrier in which the wireless device detected the consistent uplink LBT failure.

In some embodiments, the information includes a cell, or a part of a cell, in which the wireless device detected the consistent uplink LBT failure.

In some embodiments, the information includes a latency or time that the wireless device took to enter the RRC connected mode since the wireless device received an RRC release message.

In some embodiments, the report reports failure of a mobility procedure triggered by the wireless device. In this case, the information includes a reason for the failure as being the consistent uplink LBT failure detected. In one or more of these embodiments, the information further includes a carrier, and a cell or a part of a cell, in which the wireless device failed to access via the mobility procedure.

Other embodiments herein include a method performed by a radio network node configured for use in a wireless communication network. The method comprises, when a wireless device is in a Radio Resource Control, RRC, connected mode, receiving from the wireless device a report that includes information about a consistent uplink listen-before-talk, LBT, failure detected by the wireless device while the wireless device was in an RRC idle mode or an RRC inactive mode.

In some embodiments, the information includes a carrier in which the wireless device detected the consistent uplink LBT failure.

In some embodiments, the information includes a cell, or a part of a cell, in which the wireless device detected the consistent uplink LBT failure.

In some embodiments, the information includes a latency or time that the wireless device took to enter the RRC connected mode since the wireless device received an RRC release message.

In some embodiments, the report reports failure of a mobility procedure triggered by the wireless device. In this case, the information includes a reason for the failure as being the consistent uplink LBT failure detected. In one or more of these embodiments, the information further includes a carrier, and a cell or a part of a cell, in which the wireless device failed to access via the mobility procedure.

Other embodiments herein include a wireless device configured for use in a wireless communication network. The method comprises detect consistent uplink listen-before-talk, LBT, failure while the wireless device is in a Radio Resource Control, RRC, idle mode or an RRC inactive mode, and when the wireless device is in an RRC connected mode, transmit to the wireless communication network a report that includes information about the consistent uplink LBT failure detected.

In some embodiments, the wireless device is configured to perform the steps described above for a wireless device.

Other embodiments herein include a radio network node configured for use in a wireless communication network. The radio network is configured to when a wireless device is in a Radio Resource Control, RRC, connected mode, receive from the wireless device a report that includes information about a consistent uplink listen-before-talk, LBT, failure detected by the wireless device while the wireless device was in an RRC idle mode or an RRC inactive mode.

In some embodiments, the radio network node is configured to perform the steps described above for a radio network node.

Other embodiments herein include a computer program comprising instructions which, when executed by at least one processor of a wireless device, causes the wireless device to perform the steps described above for a wireless device. Other embodiments herein include a computer program comprising instructions which, when executed by at least one processor of a radio network node, causes the radio network node to perform the steps described above for a radio network node. In one or more of these embodiments, a carrier containing the computer program described above is one of an electronic signal, optical signal, radio signal, or computer readable storage medium.

Other embodiments herein include a wireless device configured for use in a wireless communication network. The wireless devices comprises communication circuitry and processing circuitry. The processing circuitry is configured to detect consistent uplink listen-before-talk, LBT, failure while the wireless device is in a Radio Resource Control, RRC, idle mode or an RRC inactive mode, and when the wireless device is in an RRC connected mode, transmit to the wireless communication network a report that includes information about the consistent uplink LBT failure detected.

In some embodiments, the processing circuitry is configured to perform the steps described above for a wireless device.

Other embodiments herein include a radio network node configured for use in a wireless communication network. The radio network node comprises communication circuitry and processing circuitry. The processing circuitry is configured to when a wireless device is in a Radio Resource Control, RRC, connected mode, receive from the wireless device a report that includes information about a consistent uplink listen-before-talk, LBT, failure detected by the wireless device while the wireless device was in an RRC idle mode or an RRC inactive mode.

In some embodiments, the processing circuitry is configured to perform the steps described above for a radio network node.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 4A is a logic flow diagram of a method performed by a wireless device according to other embodiments.

FIG. 4B is a logic flow diagram of a method performed by a radio network node according to other embodiments.

DETAILED DESCRIPTION

Figure 1:
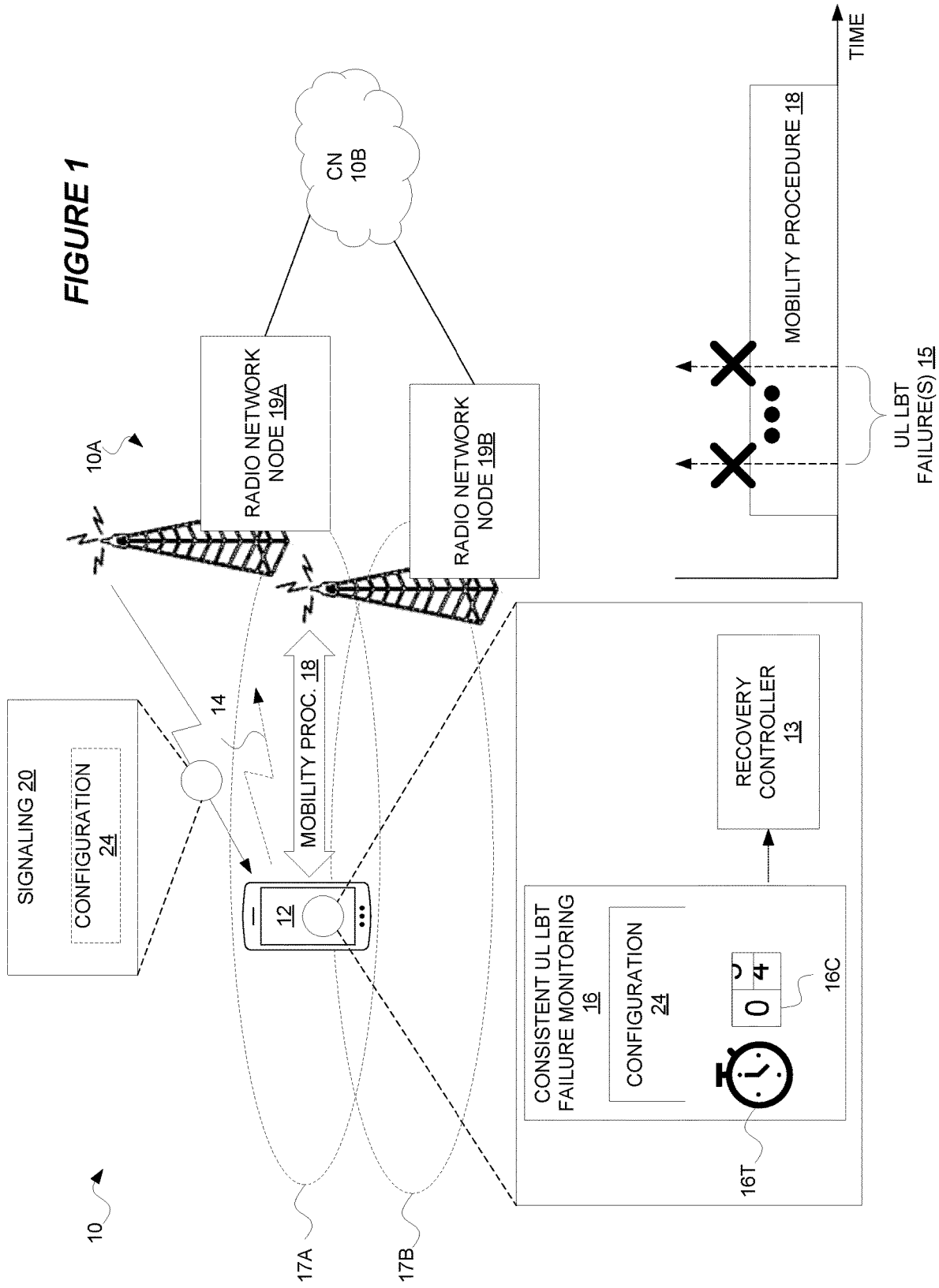
FIG. 1 is a block diagram of a wireless communication network according to some embodiments.

FIG. 1 shows a wireless communication network 10 according to some embodiments. The network 10 includes a radio access network (RAN) 10A and a core network (CN) 10B. The RAN 10A provides radio access to one or more wireless devices (e.g., user equipment, UE) and connects the wireless device(s) to the CN 10B. The CN 10B in turn connects the wireless device(s) to one or more data networks, e.g., the Internet.

FIG. 1 in particular shows a wireless device 12. The wireless device 12 may be configured to wirelessly communicate with one or more radio network nodes in the RAN 10A. The wireless device 12 in this regard may transmit communications to the radio network node(s) over an uplink and may receive communications from the radio network node(s) over a downlink. In some embodiments, the wireless device 12 operates in unlicensed frequency spectrum. The wireless device 12 in this regard may be required to successfully complete a listen-before-talk (LBT) procedure before performing an uplink (UL) transmission 14, e.g., to make sure the channel is clear before performing an UL transmission 14. Listen-before-talk as used herein broadly refers to any mechanism for assessing whether a channel is clear as a prerequisite for performing a transmission on that channel. Such mechanism may for instance involve carrier sensing, energy detection, clear channel assessment, or the like. In one embodiment, listen-before-talk is implemented as specified in ETSI EN 300 328 V.2.2.1, but this need not be the case.

In this context, the wireless device 12 in some embodiments may trigger a mobility procedure 18, e.g., from a serving cell 17A to a target cell 17B, which may be provided by a single radio network node 19A or by different respective radio network nodes 19A, 19B. The mobility procedure 18 may be triggered by the wireless device 12 in the sense that it is initiated by the wireless device 12 without the wireless device 12 having received a command from the network 10 to perform that mobility procedure 18. For example, the mobility procedure 18 may comprise cell selection, or cell reselection, while the wireless device is in a Radio Resource Control (RRC) idle mode. Or, the mobility procedure 18 may comprise cell reselection, while the wireless device is in a Radio Resource Control (RRC) inactive mode. Or, the mobility procedure 18 may comprises RRC connection re-establishment while the wireless device is in an RRC connected mode. These examples therefore contrast with a handover procedure which is explicitly triggered by the wireless communication network 10 with a handover command to the wireless device 12. The triggering of the mobility procedure 18 being by the wireless device 12 may therefore refer to the wireless device 12 being the entity that decides to perform the mobility procedure 18, e.g., as opposed to the wireless device 12 reporting a measurement result to the network 10 but the network 10 deciding to command the wireless device 12 to perform a handover procedure.

Because the mobility procedure 18 involves one or more uplink transmissions by the wireless device 12, a problem with the procedure 18 may occur because of UL LBT failure. Worse, so-called consistent UL LBT failure occurs when UL LBT failures happen consistently. Here, an UL LBT failure may happen when the UL LBT procedure, that the wireless device 12 performs as a prerequisite to an uplink transmission 14, fails, i.e., because the channel is detected as already occupied. In some embodiments, the UL LBT failures that contribute to the wireless device 12 detecting consistent UL LBT failure include UL LBT failures for any type of uplink transmission, e.g., including multiple different types such as a sounding reference signal transmission, a control channel transmission, a data channel transmission, and/or a random access channel transmission.

In this regard, the wireless device 12 according to some embodiments herein obtains a configuration 24, e.g., via signaling 20 from a radio network node 19A or 19B or via determining the configuration 24 from one or more rules. The configuration 24 governs how the wireless device 12 is to monitor for and/or attempt to recover from consistent UL LBT failure that occurs during a mobility procedure 18 triggered by the wireless device 12. The configuration 24 may for example indicate one or more counters and/or one or more timers that the wireless device 12 is to use for detecting consistent uplink LBT failure during the mobility procedure 18.

Figure 2:
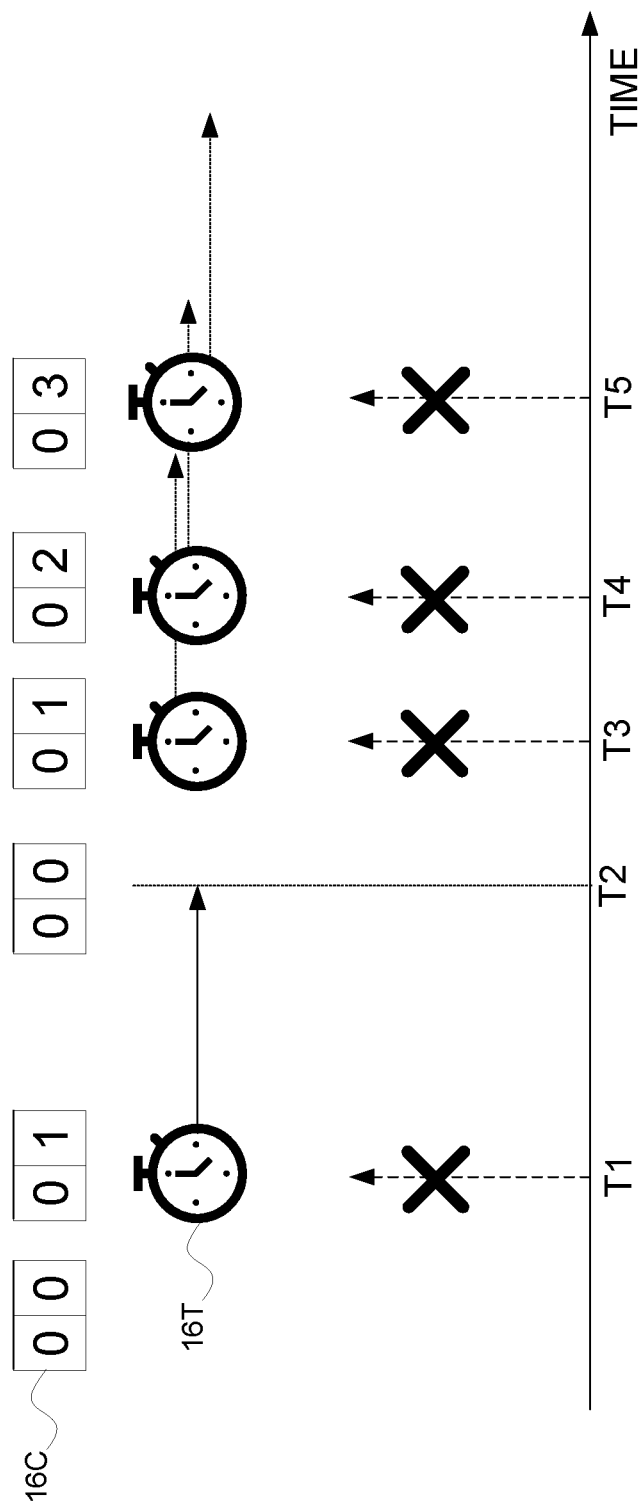
FIG. 2 is a block diagram of consistent uplink listen-before-talk failure detection according to some embodiments.

For example, FIG. 1 shows the configuration 24 configures the wireless device 12 to perform consistent UL LBT failure monitoring 16 during the mobility procedure 18. Such consistent UL LBT failure monitoring 16 is shown as employing the use of a timer 16T and a counter 16C, e.g., as indicated by the configuration 24. The timer 16T may be referred to as an UL LBT failure counter, and the timer 16T may be referred to as the inter-failure duration timer 16C. The wireless device 12 uses the UL LBT failure counter 16C to count the number of UL LBT failures that occur, e.g., across all types of uplink transmissions. The wireless device 12 uses the inter-failure duration timer 16T to reset the counter 16C when the UL LBT failures are not consistent, e.g., when no UL LBT failure occurs for at least a threshold amount of time. The UL LBT failure counter 16C and the inter-failure duration timer 16T may thereby be said to supervise consistent UL LBT failure. FIG. 2 shows one example.

As shown in FIG. 2, the wireless device 12 detects an UL LBT failure at time T1. Upon the occurrence of this UL LBT failure at time T1, the wireless device 12 increments the UL LBT failure counter 16C from 00 to 01 and starts (or re-starts) the inter-failure duration timer 16T. In this example, the inter-failure duration timer 16T expires at time T2, since no other UL LBT failure occurs between time T1 and T2. Upon expiration of the inter-failure duration timer 16T, the wireless device 12 resets the UL LBT failure counter 16C to 00. However, at time T3, the wireless device 12 detects another UL LBT failure. Upon the occurrence of this UL LBT failure at time T3, the wireless device 12 increments the UL LBT failure counter 16C from 00 to 01 and starts (or re-starts) the inter-failure duration timer 16T. Before the inter-failure duration timer 16T can expire, yet another UL LBT failure occurs at time T4. The wireless device 12 accordingly increments the UL LBT failure counter 16C from 01 to 02, i.e., to record that the number of consistent UL LBT failures is 2. The wireless device 12 also restarts the inter-failure duration timer 16T. Before the inter-failure duration timer 16T can expire this time, still another UL LBT failure occurs at time T5. The wireless device 12 accordingly increments the UL LBT failure counter 16C from 02 to 03, i.e., to record that the number of consistent UL LBT failures is 3. The wireless device 12 also restarts the inter-failure duration timer 16T. This process may continue until the UL LBT failure counter 16C reaches a threshold. Once the UL LBT failure counter 16C reaches the threshold, the wireless device 12 may consider itself as having detected consistent UL LBT failure.

In the example of FIG. 1, then, the wireless device 12 monitors for UL LBT failure(s) 15 during the mobility procedure 18, e.g., according to the configuration 24. During the mobility procedure 18 as shown, UL LBT failures 15 occur, e.g., for uplink transmission(s) involved in the procedure 18. As a result, consistent UL LBT failure monitoring 16 detects consistent UL LBT failure (e.g., the counter 16C reaches its threshold). In this example, the UL LBT failures 15 may cause the procedure 18 to fail to complete successfully.

In some embodiments, the configuration 24 alternatively or additionally governs how the wireless device is to attempt to recover from such a consistent UL LBT failure that occurs during the mobility procedure 18. FIG. 1 for example shows the wireless device 12 includes a recovery controller 13 that, according to the configuration 24, controls attempts by the wireless device to recover from any consistent UL LBT failure detected by consistent UL LBT failure monitoring 16. In one embodiment, for example, the configuration 24 indicates one or more cells, or one or more parts of a cell, towards which the wireless device 12 is to attempt the mobility procedure 18 in order to recover from consistent uplink LBT failure detected when attempting the mobility procedure 18 towards a target cell. Here, the one or more parts of a cell may include one or more time resources, one or more frequency resources, one or more areas within the cell, and/or one or more beams of the cell. Other recovery attempt actions herein are described with reference to the FIRST embodiment below.

In some embodiments, though, responsive to failing to recover from consistent uplink LBT failure, the wireless device 12 may only then consider radio link failure (RLF) to be detected. Radio link failure in some embodiments is a failure of the uplink at a lower layer of a protocol stack for the uplink. In some embodiments, then, once the wireless device 12 considers RLF to have been detected, the wireless device 12 may release the uplink and/or attempt to re-establish the uplink from scratch. So, responsive to radio link failure being detected, the wireless device 12 may transmit a request for connection re-establishment, e.g., where the request indicates a cause of the request for connection re-establishment as being consistent uplink LBT failure.

Accordingly, in these and other embodiments, the wireless device 12 may indicate to the network that consistent UL LBT failure was the cause of the mobility procedure 18 failing to complete successfully and/or the cause of the wireless device 12 requesting connection re-establishment. For example, upon detecting RLF due to detecting a problem with the mobility procedure 18, the wireless device 12 may transmit a request for connection re-establishment to the network, e.g., to radio network node 19B. In some embodiments, the wireless device 12 indicates in the request that the cause of the request is consistent uplink LBT failure. The wireless device 12 may do so for instance if the wireless device 12 detected consistent UL LBT failure while monitoring for a problem with the mobility procedure 18.

Figure 3A:
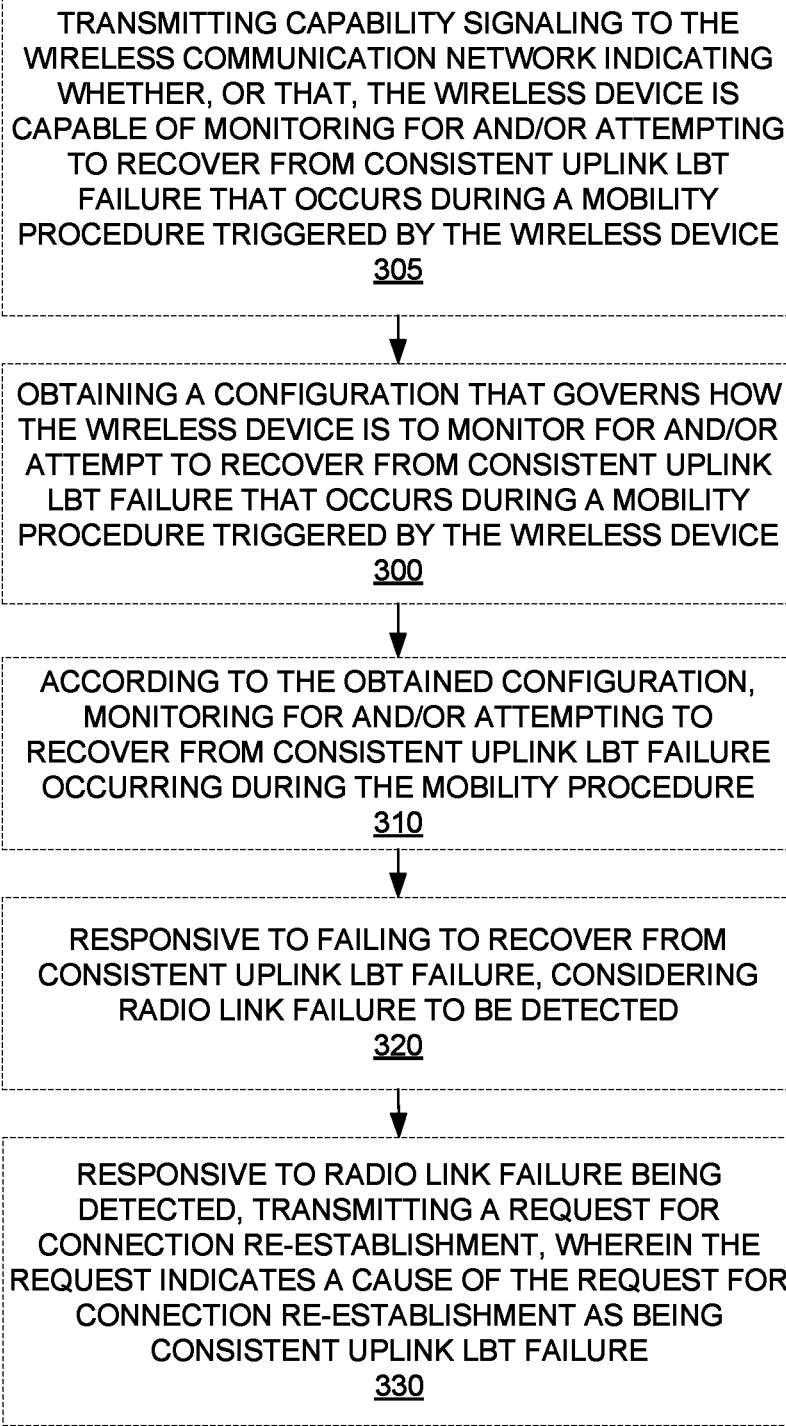
FIG. 3A is a logic flow diagram of a method performed by a wireless device according to some embodiments.

Generally, then, FIG. 3A depicts a method performed by a wireless device 12 in accordance with particular embodiments. The method as shown may comprise obtaining a configuration 24 that governs how the wireless device 12 is to monitor for and/or attempt to recover from consistent uplink LBT failure that occurs during a mobility procedure 18 triggered by the wireless device 12 (Block 300). This mobility procedure 18 may, for example, be cell selection, or cell reselection, while the wireless device 12 is in an RRC idle mode. Or, as another example, the mobility procedure 18 may be cell reselection, while the wireless device 12 is in an RRC inactive mode. As still another example, the mobility procedure 18 may be RRC connection re-establishment while the wireless device 12 is in an RRC connected mode. In any event, the method may further comprise, according to the obtained configuration 24, monitoring for and/or attempting to recover from consistent uplink LBT failure occurring during the mobility procedure 18 (Block 310).

In some embodiments, for example, the configuration 24 indicates one or more cells, or one or more parts of a cell, towards which the wireless device 12 is to attempt the mobility procedure 18 in order to recover from consistent uplink LBT failure detected when attempting the mobility procedure 18 towards a target cell. The one or more parts of a cell may for example include one or more time resources, one or more frequency resources, one or more areas within the cell, and/or one or more beams of the cell.

In other embodiments, the configuration 24 alternatively or additionally indicates one or more counters and/or one or more timers that the wireless device 12 is to use for detecting consistent uplink LBT failure. For example, in some embodiments, the method comprises, upon an occurrence of an uplink LBT failure, for any type of uplink transmission, incrementing an uplink LBT failure counter and starting or restarting an inter-failure duration timer, where the uplink LBT failure counter is to be reset to zero upon expiration of the inter-failure duration timer. In this case, the method may comprise detecting consistent uplink LBT failure when the counter reaches or exceeds a threshold. In some embodiments, then, the configuration 24 indicates the uplink LBT failure counter and/or a value of the inter-failure duration timer. In one such embodiment, uplink LBT failures that contribute to detecting consistent uplink LBT failure include uplink LBT failures for any of multiple different types of uplink transmissions, e.g., a sounding reference signal transmission, a control channel transmission, a data channel transmission, and/or a random access channel transmission.

In some embodiments, obtaining the configuration 24 comprises receiving, from a network node, signaling 20 indicating at least a part of the configuration 24. For example, the signaling 20 may be received while the wireless device 12 is in RRC idle mode or RRC inactive mode. Or, the signaling 20 may be received while the wireless device 12 is in RRC connected mode, in which case the method may further comprise storing the configuration 24 for use while the wireless device 12 is in RRC idle mode or RRC inactive mode. In any case, the signaling 20 may indicate at least a part of the configuration 24 in system information and/or be received from a source cell or a target cell of the mobility procedure 18. Alternatively or additionally, the signaling 20 may comprise cell-common signaling that is commonly sent to multiple wireless devices in a source cell or a target cell of the mobility procedure 18.

In other embodiments, obtaining the configuration 24 alternatively or additionally comprises determining at least a part of the configuration 24 from one or more rules, e.g., based on a type of the mobility procedure 18, an RRC state of the wireless device 12, a capability of the wireless device 12, and/or a type of a target cell of the mobility procedure 18. Such determination may for instance entail determining the configuration 24 to be a default configuration. Or, in embodiments where the configuration 24 governs how the wireless device 12 is to monitor for and/or attempt to recover from consistent uplink LBT failure during a mobility procedure 18 towards a target cell, determining at least a part of the configuration 24 may involve determining at least a part of the configuration 24 based on a configuration that governs how the wireless device 12 is to monitor for and/or attempt to recover from consistent uplink LBT failure while the wireless device 12 is being served by a serving cell.

In some embodiments, the configuration 24 is specific to a target cell of the mobility procedure 18. Alternatively, the configuration 24 may be applicable to any target cell of any mobility procedure 18 triggered by the wireless device 12. Alternatively or additionally, the configuration 24 may be specific to an RRC state of the wireless device 12, and/or specific to a frequency band or range in which the wireless device 12 is operating.

In some embodiments, the method further comprises, responsive to failing to recover from consistent uplink LBT failure, considering radio link failure to be detected (Block 320). In this case, the method may also comprise, responsive to radio link failure being detected, transmitting a request for connection re-establishment, where the request indicates a cause of the request for connection re-establishment as being consistent uplink LBT failure (Block 330).

In one or more embodiments, the method may also comprise transmitting capability signaling to the wireless communication network 10 indicating whether, or that, the wireless device 12 is capable of monitoring for and/or attempting to recover from consistent uplink LBT failure that occurs during a mobility procedure 18 triggered by the wireless device 12 (Block 305).

Figure 3B:
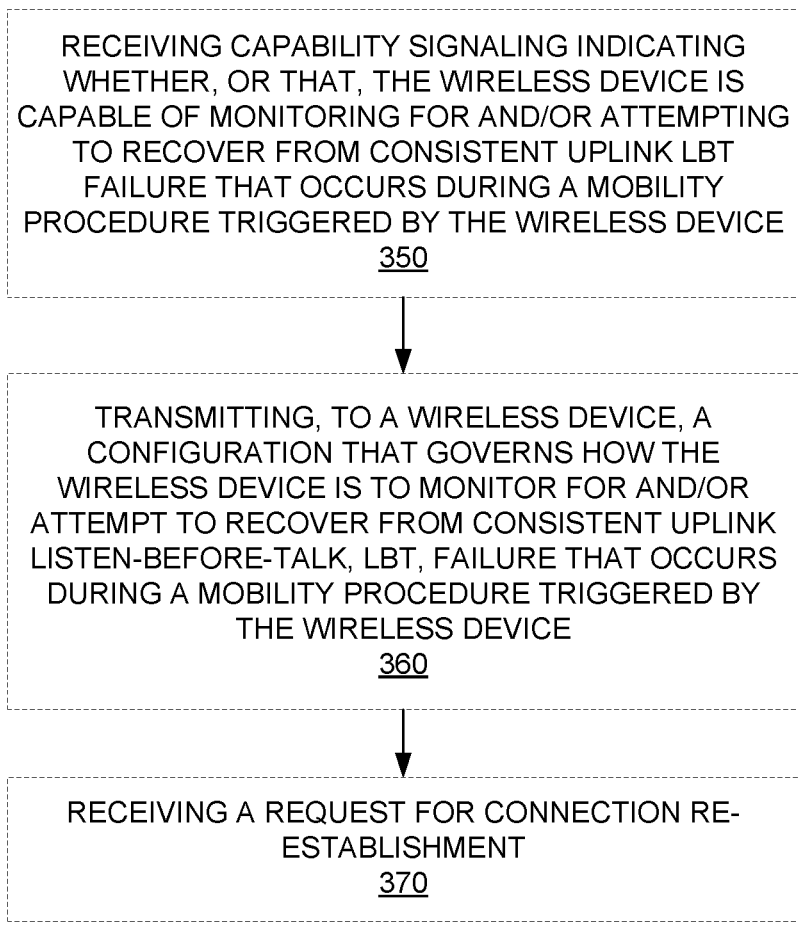
FIG. 3B is a logic flow diagram of a method performed by a radio network node according to some embodiments.

FIG. 3B depicts a method performed by a radio network node 19A, 19B in accordance with particular embodiments. The method comprises transmitting, to a wireless device 12, a configuration 24 that governs how the wireless device 12 is to monitor for and/or attempt to recover from consistent uplink LBT failure that occurs during a mobility procedure 18 triggered by the wireless device 12 (Block 360). This may involve for instance transmitting signaling 20 indicating at least a part of the configuration 24. Regardless, the mobility procedure 18 may, for example, be cell selection, or cell reselection, while the wireless device 12 is in an RRC idle mode. Or, as another example, the mobility procedure 18 may be cell reselection, while the wireless device 12 is in an RRC inactive mode. As still another example, the mobility procedure 18 may be RRC connection re-establishment while the wireless device 12 is in an RRC connected mode.

In some embodiments, for example, the configuration 24 indicates one or more cells, or one or more parts of a cell, towards which the wireless device 12 is to attempt the mobility procedure 18 in order to recover from consistent uplink LBT failure detected when attempting the mobility procedure 18 towards a target cell. The one or more parts of a cell may for example include one or more time resources, one or more frequency resources, one or more areas within the cell, and/or one or more beams of the cell.

In other embodiments, the configuration 24 alternatively or additionally indicates one or more counters and/or one or more timers that the wireless device 12 is to use for detecting consistent uplink LBT failure. For example, in some embodiments, the configuration 24 indicates an uplink LBT failure counter and/or a value of an inter-failure duration timer. Here, upon an occurrence of an uplink LBT failure, for any type of uplink transmission, the uplink LBT failure counter is to be incremented and the inter-failure duration timer is to be started or restarted. And the uplink LBT failure counter is to be reset to zero upon expiration of the inter-failure duration timer. In this case, consistent uplink LBT failure is to be detected when the counter reaches or exceeds a threshold. In one such embodiment, uplink LBT failures that contribute to detecting consistent uplink LBT failure include uplink LBT failures for any of multiple different types of uplink transmissions, e.g., a sounding reference signal transmission, a control channel transmission, a data channel transmission, and/or a random access channel transmission.

In some embodiments, the signaling 20 is transmitted while the wireless device 12 is in RRC idle mode or RRC inactive mode. Or, the signaling 20 may be transmitted while the wireless device 12 is in RRC connected mode, in which case the configuration 24 may be valid for use while the wireless device 12 is in RRC idle mode or RRC inactive mode. In any case, the signaling 20 may indicate at least a part of the configuration 24 in system information and/or be transmitted from a source cell or a target cell of the mobility procedure 18. Alternatively or additionally, the signaling 20 may comprise cell-common signaling that is commonly sent to multiple wireless devices in a source cell or a target cell of the mobility procedure 18.

In some embodiments, the configuration 24 is based on a type of the mobility procedure 18, an RRC state of the wireless device 12, a capability of the wireless device 12, and/or a type of a target cell of the mobility procedure 18. In some embodiments, the configuration 24 is a default configuration.

In some embodiments, the configuration 24 is specific to a target cell of the mobility procedure 18. Alternatively, the configuration 24 may be applicable to any target cell of any mobility procedure 18 triggered by the wireless device 12. Alternatively or additionally, the configuration 24 may be specific to an RRC state of the wireless device 12, and/or specific to a frequency band or range in which the wireless device 12 is operating.

In some embodiments, the method further comprises receiving a request for connection re-establishment, where the request indicates a cause of the request for connection re-establishment as being consistent uplink LBT failure (Block 370).

In one or more embodiments, the method may also comprise receiving capability signaling indicating whether, or that, the wireless device 12 is capable of monitoring for and/or attempting to recover from consistent uplink LBT failure that occurs during a mobility procedure 18 triggered by the wireless device 12 (Block 350).

The embodiments described with respect to FIGS. 1, 3A, and 3B may be exemplified as the "FIRST embodiment" in the below description.

Yet other embodiments herein may effectively supervise the mobility procedure 18 for consistent UL LBT failure, but do so in a way that does not explicitly rely on UL LBT detection. In some embodiments, for example, one or more timers are established for the mobility procedure 18 such that the wireless device 12 detects a problem with the procedure 18 when it does not complete within the required time, which may for instance occur due to consistent UL LBT failure. The timer(s) here then may effectively account for and detect consistent UL LBT failure during the device-triggered mobility procedure 18, even though the timer(s) may not themselves be dedicated to or explicitly for detecting consistent UL LBT failure.

FIG. 4A depicts a method performed by a wireless device 12 in accordance with these other embodiments. The method comprises starting a timer upon initiating a mobility procedure 18 to establish or resume an RRC connection (Block 400). The method further comprises, upon expiry of the timer, performing one or more recovery actions to attempt to recover from failure of the mobility procedure 18 to complete within a duration of the timer (Block 410). Alternatively or additionally, the method may further comprise, upon expiry of the timer, logging, or reporting to the wireless communication network, failure of the mobility procedure or failure of the mobility procedure due to consistent LBT failure (Block 420).

In some embodiments, the timer is configured to be stopped upon reception of a message indicating success or failure of the mobility procedure 18, or upon the mobility procedure 18 being aborted by the wireless device 12.

In some embodiments, the mobility procedure 18 includes a random access procedure and an RRC connection establishment or resume procedure, in which case starting the timer may comprise starting the timer upon initiating the random access procedure. In one such embodiment, the timer is configured to be stopped upon reception of a message indicating success or failure of the RRC connection establishment or resume procedure, or upon the RRC connection establishment or resume procedure being aborted by the wireless device 12.

In some embodiments, starting the timer comprises starting the timer upon initiating a mobility procedure 18 to establish or resume an RRC connection to a target cell or a part of a target cell, e.g., where the timer may be specific to the target cell or the part of the target cell. In one embodiment, the one or more recovery actions comprise stopping attempts to connect to the target cell or the part of the target cell. In another embodiment, the one or more recovery actions comprise selecting another target cell or another part of the target cell towards which to initiate a mobility procedure, e.g., where the another target cell is served on the same carrier frequency as the target cell.

In some embodiments where a lower layer of a protocol stack at the wireless device 12 monitors for expiry of the timer, the method further comprises the lower layer informing an upper layer of the protocol stack at the wireless device 12 about the failure of the mobility procedure 18.

Although not shown, the method may also comprise, upon expiry of the timer, transitioning to an RRC idle state. Alternatively or additionally, the method may further comprise, based on expiry of the timer, barring or downprioritizing a target cell of the mobility procedure 18 or a carrier frequency on which the target cell is served.

FIG. 4B depicts a method performed by a radio network node 19A, 19B in accordance with other embodiments. The method comprises transmitting, to a wireless device 12, a value of a timer that the wireless device 12 is to start upon initiating a mobility procedure 18 to establish or resume an RRC connection (Block 450).

In some embodiments, the timer is configured to be stopped upon reception of a message indicating success or failure of the mobility procedure 18, or upon the mobility procedure 18 being aborted by the wireless device 12.

In some embodiments, the mobility procedure 18 includes a random access procedure and an RRC connection establishment or resume procedure, in which case the timer is to be started upon initiating the random access procedure. In one such embodiment, the timer is be stopped upon reception of a message indicating success or failure of the RRC connection establishment or resume procedure, or upon the RRC connection establishment or resume procedure being aborted by the wireless device 12.

In some embodiments, the timer is to be started upon initiating a mobility procedure 18 to establish or resume an RRC connection to a target cell or a part of a target cell, e.g., where the timer may be specific to the target cell or the part of the target cell.

In some embodiments, the one or more recovery actions are to be performed by the wireless device 12 upon expiry of the timer, in order to attempt to recover from failure of the mobility procedure 18 to complete within a duration of the timer, e.g., where the one or more recovery actions comprise stopping attempts to connect to the target cell or the part of the target cell. In other embodiments, the one or more recovery actions are to be performed by the wireless device 12 upon expiry of the timer, in order to attempt to recover from failure of the mobility procedure 18 to complete within a duration of the timer, e.g., the one or more recovery actions comprise selecting another target cell or another part of the target cell towards which to initiate a mobility procedure. For example, the another target cell may be served on the same carrier frequency as the target cell.

In some embodiments, the method also comprises receiving a report from the wireless device 12 indicating failure of the mobility procedure 18 or failure of the mobility procedure 18 due to consistent LBT failure (Block 460).

The embodiments described with respect to 4A, and 4B may be exemplified as the "SECOND embodiment" in the below description.

Other embodiments herein include another method performed by a wireless device configured for use in a wireless communication network. The method comprises counting a number of attempts by the wireless device to perform a mobility procedure to establish or resume an RRC connection. The method also comprises, upon the counted number of attempts reaching a certain number, performing one or more recovery actions to recover from failure of the wireless device to successfully complete the mobility procedure.

Yet other embodiments herein include another method performed by a wireless device configured for use in a wireless communication network. The method comprises transmitting capability signaling to the wireless communication network indicating whether, or that, the wireless device is capable of monitoring for and/or attempting to recover from consistent uplink Listen-Before-Talk, LBT, failure that occurs during a mobility procedure triggered by the wireless device.

Still other embodiments herein include a method performed by a radio network node 19A, 19B configured for use in a wireless communication network. The method comprises receiving, from a wireless device 12, capability signaling indicating whether, or that, the wireless device 12 is capable of monitoring for and/or attempting to recover from consistent uplink LBT failure that occurs during a mobility procedure 18 triggered by the wireless device 12.

Embodiments herein also include corresponding apparatuses. Embodiments herein for instance include a wireless device configured to perform any of the steps of any of the embodiments described above for the wireless device.

Embodiments also include a wireless device 12 comprising processing circuitry and power supply circuitry. The processing circuitry is configured to perform any of the steps of any of the embodiments described above for the wireless device 12. The power supply circuitry is configured to supply power to the wireless device 12.

Embodiments further include a wireless device 12 comprising processing circuitry. The processing circuitry is configured to perform any of the steps of any of the embodiments described above for the wireless device 12. In some embodiments, the wireless device 12 further comprises communication circuitry.

Embodiments further include a wireless device 12 comprising processing circuitry and memory. The memory contains instructions executable by the processing circuitry whereby the wireless device 12 is configured to perform any of the steps of any of the embodiments described above for the wireless device 12.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device 12. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node 19A, 19B configured to perform any of the steps of any of the embodiments described above for the radio network node 19A, 19B.

Embodiments also include a radio network node 19A, 19B comprising processing circuitry and power supply circuitry. The processing circuitry is configured to perform any of the steps of any of the embodiments described above for the radio network node 19A, 19B. The power supply circuitry is configured to supply power to the radio network node 19A, 19B.

Embodiments further include a radio network node 19A, 19B comprising processing circuitry. The processing circuitry is configured to perform any of the steps of any of the embodiments described above for the radio network node 19A, 19B. In some embodiments, the radio network node 19A, 19B further comprises communication circuitry.

Embodiments further include a radio network node 19A, 19B comprising processing circuitry and memory. The memory contains instructions executable by the processing circuitry whereby the radio network node 19A, 19B is configured to perform any of the steps of any of the embodiments described above for the radio network node 19A, 19B.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
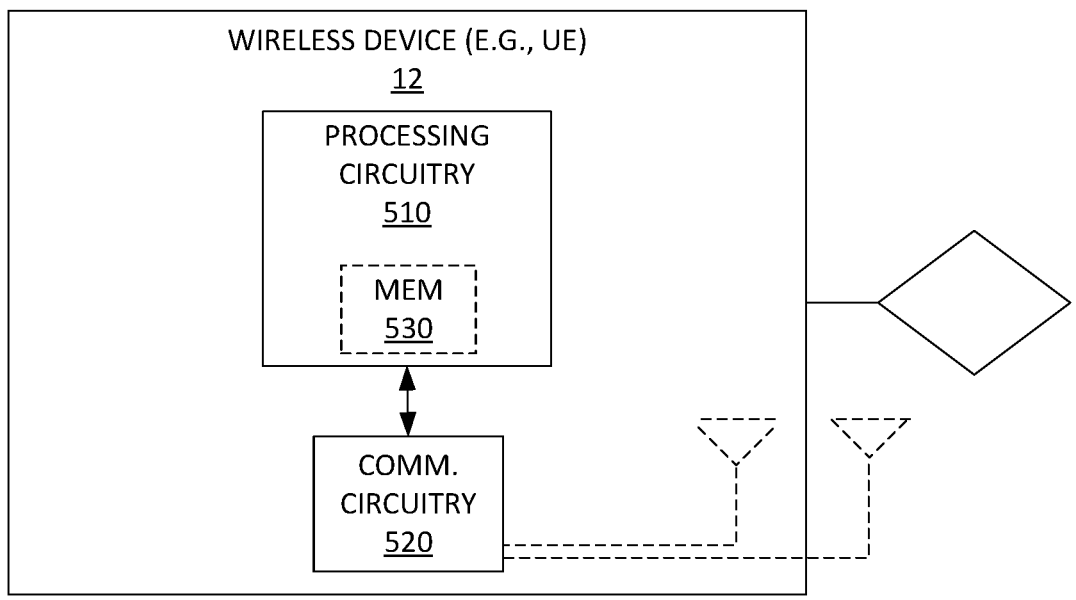
FIG. 5 is a block diagram of a wireless device according to some embodiments.

FIG. 5 for example illustrates a wireless device 12 as implemented in accordance with one or more embodiments. As shown, the wireless device 12 includes processing circuitry 510 and communication circuitry 520. The communication circuitry 520 (e.g., radio circuitry) is configured to transmit and/or receive information to and/or from one or more other nodes, e.g., via any communication technology. Such communication may occur via one or more antennas that are either internal or external to the wireless device 12. The processing circuitry 510 is configured to perform processing described above, e.g., in FIG. 3A and/or FIG. 4A, such as by executing instructions stored in memory 530. The processing circuitry 510 in this regard may implement certain functional means, units, or modules.

Figure 6:
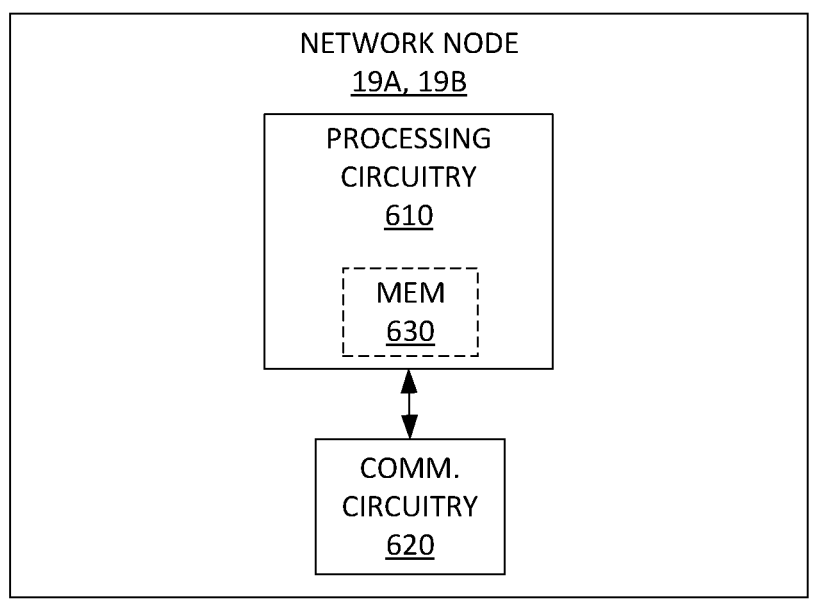
FIG. 6 is a block diagram of a radio network node according to some embodiments.

FIG. 6 illustrates a radio network node 19A, 19B as implemented in accordance with one or more embodiments. As shown, the radio network node 19A, 19B includes processing circuitry 610 and communication circuitry 620. The communication circuitry 620 is configured to transmit and/or receive information to and/or from one or more other nodes, e.g., via any communication technology. The processing circuitry 610 is configured to perform processing described above, e.g., in FIG. 3B and/or FIG. 4B, such as by executing instructions stored in memory 630. The processing circuitry 610 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described. In one or more of the embodiments described, the wireless device 12 herein is exemplified as a user equipment (UE) and the radio network nodes 19A, 19B are exemplified as gNBs.

Some embodiments herein are applicable in the 5th generation of cellular system, called New Radio (NR) as being standardized in the $3^{rd}$ Generation Partnership Project (3GPP). NR is developed for maximum flexibility to support multiple and substantially different use cases. Besides the typical mobile broadband use case, also machine type communication (MTC), ultra-low latency critical communications (URLCC), side-link device-to-device (D2D) and several other use cases are supported too.

A UE in some embodiments herein may be in RRC_IDLE, RRC_CONNECTED, or RRC_INACTIVE state. In RRC_IDLE, the UE does not have any RRC connection established, whereas in RRC_CONNECTED the UE does have an RRC connection established. In RRC_INACTIVE, the UE's RRC connection is suspended. In particular, RRC_INACTIVE is a state where a UE remains in CM-CONNECTED and can move within an area configured by NG-RAN (the RAN Notification Area, RNA) without notifying NG-RAN. In RRC_INACTIVE, the last serving gNB node keeps the UE context and the UE-associated NG connection with the serving Access and Mobility Function (AMF) and User Plane Function (UPF).

A UE in RRC_IDLE or RRC_INACTIVE performs cell reselection. See clause 9.2.1.2 in the 3GPP TS 38.300 v 16.0.0.

NR supports flexible bandwidth configurations for different user equipments (UEs) on the same serving cell. In other words, the bandwidth monitored by a UE and used for its control and data channels may be smaller than the carrier bandwidth. One or multiple bandwidth part configurations for each component carrier can be semi-statically signaled to a UE, where a bandwidth part consists of a group of contiguous Physical Resource Blocks (PRBs). Reserved resources can be configured within the bandwidth part. The bandwidth of a bandwidth part equals to or is smaller than the maximal bandwidth capability supported by a UE.

NR is targeting both licensed and unlicensed bands, where NR targeting unlicensed bands is referred to as NR-U. Allowing unlicensed networks, i.e., networks that operate in shared spectrum (or unlicensed spectrum), to effectively use the available spectrum is an attractive approach to increase system capacity. Although unlicensed spectrum does not match the qualities of the licensed regime, solutions that allow an efficient use of it as a complement to licensed deployments have the potential to bring great value to the 3GPP operators, and, ultimately, to the 3 GPP industry as a whole. It is expected that some features in NR will need to be adapted to comply with the special characteristics of the unlicensed band as well as also different regulations. A subcarrier spacing of 15 or 30 kHz are the most promising candidates for NR-U OFDM numerologies for frequencies below 6 GHz.

When operating in unlicensed spectrum, many regions in the world require a device to sense the medium as free before transmitting, This operation is often referred to as listen-before-talk or LBT for short. There are many different flavors of LBT, depending on which radio technology the device uses and which type of data it wants to transmit at the moment. Common for all flavors is that the sensing is done in a particular channel (corresponding to a defined carrier frequency) and over a predefined bandwidth. For example, in the 5 GHz band, the sensing is done over 20 MHz channels.

Many devices are capable of transmitting (and receiving) over a wide bandwidth including of multiple sub-bands/channels, e.g., LBT sub-band (i.e., the frequency part with bandwidth equals to LBT bandwidth). A device is only allowed to transmit on the sub-bands where the medium is sensed as free. Again, there are different flavors of how the sensing should be done when multiple sub-bands are involved.

In principle, there are two ways a device can operate over multiple sub-bands. One way is that the transmitter/receiver bandwidth is changed depending on which sub-bands were sensed as free. In this setup, there is only one component carrier (CC) and the multiple sub-bands are treated as a single channel with a larger bandwidth. The other way is that the device operates almost independent processing chains for each channel. Depending on how independent the processing chains are, this option can be referred to as either carrier aggregation (CA) or dual connectivity (DC).

Consider now a channel access procedure in NR unlicensed spectrum (NR-U). Listen-before-talk (LBT) is designed for unlicensed spectrum co-existence with other radio access technologies (RATs). In this mechanism, a radio device applies a clear channel assessment (CCA) check (i.e. channel sensing) before any transmission. The transmitter involves energy detection (ED) over a time period compared to a certain threshold (ED threshold) in order to determine if a channel is idle. In case the channel is determined to be occupied, the transmitter performs a random back-off within a contention window before the next CCA attempt. In order to protect the ACK transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MCOT)). For quality of service (QoS) differentiation, a channel access priority based on the service type has been defined. For example, there are four LBT priority classes are defined for differentiation of contention window sizes (CWS) and MCOT between services.

Prior to any transmission in the uplink, the UE may need to perform the LBT operation to grasp the channel. For instance, the Medium Access Control (MAC) layer initiates a transmission, the MAC layer requests the Physical (PHY) layer to initiate the LBT operation, and the PHY layer further sends an indicator to the MAC indicating the LBT outcome (i.e., success or failure).

Some embodiments herein may be applicable in a context for radio link monitoring in LTE and NR licensed. One of the main intentions of the Radio Link Failure (RLF) procedure in Long Term Evolution (LTE) was to assist the UE to perform a fast and reliable recovery without going via RRC_IDLE. It is beneficial to avoid unnecessary latency due to the Random Access Channel (RACH) access and Radio Resource Control (RRC) connection establishment from RRC IDLE. The radio link monitoring of the serving cell followed by RRC re-establishment to the target cell in LTE is illustrated in FIG. 7.

Figure 7:
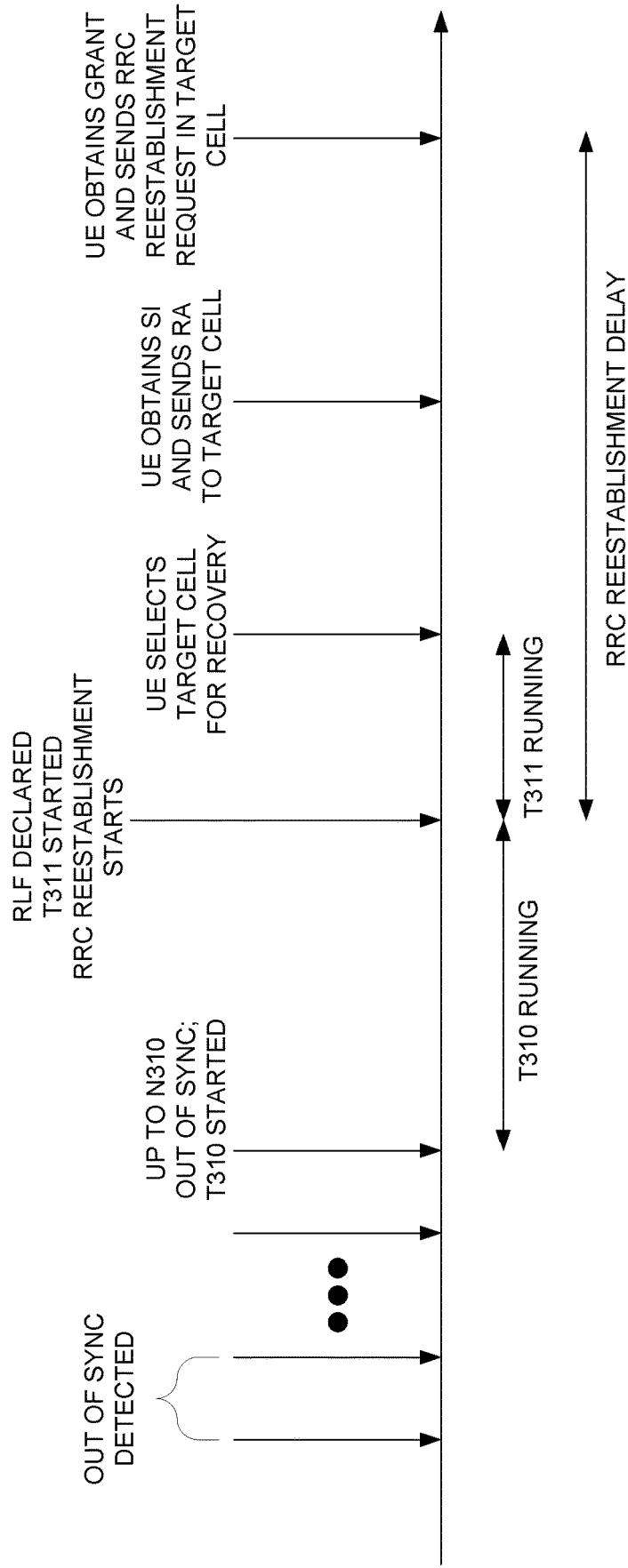
FIG. 7 is a timing diagram for radio link failure detection according to some embodiments.

As shown in FIG. 7, the UE detects a certain number (N310) of out-of-sync indications from the physical layer, at which point a timer T310 is started. Expiry of the timer means that the out-of-sync status has not resolved. Upon expiry of the timer, then, the UE declared RLF and starts RRC Re-establishment. To do so, the UE selects a target cell for recovery, obtains system information (SI), and sends a random access (RA) preamble to the selected target cell. The UE thereafter obtains an uplink grant and sends the RRC re-establishment request in the target cell.

As demonstrated by FIG. 7, then, one reason that may lead to radio link failure is timer T310 expiry. Specifically, while the UE is in RRC connected mode, the UE monitors the downlink radio channel quality based on the downlink reference symbol. The UE compares the measured downlink channel quality with the out-of-sync and in-sync thresholds, Qout and Qin respectively. The physical channel evaluates the downlink channel quality, periodically sends indication on out-of-sync or in-sync, to layer 3. The UE layer 3 then evaluates if radio link failure has occurred based on the in-sync and out-of-sync indications, that output from the layer 3 filter.

When the consecutively received out-of-sync indications are beyond the counter N310, a timer T310 is started. While T310 is running, the radio link is considered to be recovered if the UE consecutively receives N311 in-sync indications from the physical layer. When the timer T310 is expired, a radio link failure is declared by the UE.

Another reason that may lead to radio link failure is that a maximum number of radio link control (RLC) retransmissions in the uplink is reached.

Yet another reason that may lead to radio link failure is handover failure and timer T304 expiry. Specially, during a handover procedure, the timer T304 is started when the UE receives a handover command from the source cell. The value of the timer T304 should be set to allow the UE to try the maximum RACH access attempts to the target cell. When the timer T304 is expired, a radio link failure due to handover is detected.

When a radio link failure is triggered, the radio connection re-establishment is triggered. A UE shall first perform cell search to determine the best cell for radio link re-establishment. According to 3GPP TS 36.300 v15.7.0, a UE can select the same cell, a different cell from the same eNB, or a prepared cell from a different eNB, wherein the activity can be resumed (i.e., the UE stays in connected mode) via radio connection re-establishment procedure since the previous UE context can be retrieved by inter-cell communication. However, when a prepared cell is not available, the UE selects an unprepared cell. In this case, the UE has to go to idle mode and try to setup the radio connection afterwards. In this case, activity of the UE cannot be resumed. Table 10.1.6-1 from 3GPP TS 36.300 v15.7.0 guides the UE behavior for target cell selection.

Consider now additional details of consistent UL LBT failure handling in some embodiments. During a Radio Link Monitoring (RLM) procedure, the RLM reference signals (RSs) may be subject to LBT failures. Therefore, a UE may miss one or several RS receptions, which would impact on triggering of RLF. For any uplink transmission, a UE may need to perform an LBT operation. The transmission would be dropped if the LBT operation fails. This can affect how to manage the counters of different MAC procedures such as preamble counter or scheduling request (SR) counter. If the preamble counter is not incremented, the UE may delay entering the RLF procedure, which is certainly not desired. This would call for a separate counter which counts the amount of LBT failures for RA transmission, upon which the UE can trigger RLF if the counter reaches a maximum value.

In some embodiments, the Layer 2 (L2) LBT failure mechanism may take into account any LBT failure regardless of UL transmission type. The UL LBT failure mechanism will have the same recovery mechanism for all failures regardless of UL transmission type. UL LBT failures are detected per bandwidth part (BWP). The UE will report the occurrence of consistent UL LBT failures on PSCell and SCells. Here, PSCell refers to the primary cell of a secondary cell group (SCG) in multi-connectivity, e.g., dual connectivity. And SCells refer to cells in the SCG.

A "threshold" for the maximum number of LBT failures which triggers the "consistent" LBT failure event may be used. Both a timer and a counter may be used, where the counter is reset when timer expires and incremented when UL LBT failure happens. The timer may be started/restarted when UL LBT failure occurs.

Accordingly, a mechanism may be defined at the MAC layer to handle consistent UL LBT failures. Both a timer and a counter may be introduced in the mechanism for triggering of a consistent UL LBT failure event.

In some embodiments, the mechanism may be implemented in the NR MAC spec (i.e., 3GPP TS 38.321 V 15.7.0) similarly as for Beam Failure Detection and Recovery procedure:

The MAC entity may be configured by RRC with a consistent LBT failure recovery procedure. Consistent LBT failure is detected by counting LBT failure indications, for all UL transmissions, from the lower layers to the MAC entity.

RRC configures the following parameters in the Ibt-FailureRecoveryConfig:
  Ibt-FailureInstanceMaxCount for the consistent LBT failure detection;
  Ibt-FailureDetectionTimer for the consistent LBT failure detection;

The following UE variables are used for the consistent LBT failure detection procedure:
  LBT_COUNTER: counter for LBT failure indication which is initially set to 0.

The MAC entity shall:

```
1> if LBT failure indication has been received from lower layers:
    2> start or restart the lbt-FailureDetectionTimer;
    2> increment LBT_COUNTER by 1;
    2> if LBT_COUNTER >= lbt-FailureInstanceMaxCount:
        3> initiate a recovery mechanism
1> if the lbt-FailureDetectionTimer expires; or
[1> if lbt-FailureDetectionTimer or lbt-FailureInstanceMaxCount is reconfigured by upper
layers:]
    2> set LBT_COUNTER to 0.
[1> if the recovery mechanism is successful:
    2> set LBT_COUNTER to 0;
    2> consider the LBT Failure Recovery procedure successfully completed.]
```

Accordingly, the LBT_COUNTER above may be an example of the counter 16C discussed in FIG. 2 and the Ibt-FailureDetectionTimer may be an example of the timer 16T discussed in FIG. 2.

In some embodiments, the UE shall trigger a radio link failure (RLF) event if the consistent UL LBT failure has been detected in all configured BWPs in the primary cell. That is, the UE shall perform RLF recovery if the consistent UL LBT failure was detected on the PCell and UL LBT failure was detected on "N" possible BWPs.

A UE may be configured with several BWPs. UL LBT failure handling should be operated per BWP. The UE shall maintain a timer and a counter for the active BWP. Whenever the UE switches to a different BWP. The UE shall reset the timer and the counter in the new active BWP for detection of UL LBT failures. At the same time, the UE resets the timer and the counter in the de-activated BWP. If the active BWP comprises several LBT subbands, it is enough for the UE to keep a common counter across LBT subbands with the same BWP. In other words, an UL LBT problem is only declared in case the number of LBT failures from any LBT subbands has reached a predefined counter.

Consider now recovery actions upon detection of consistent UL LBT failures.

If a UE experiences LBT problems in its current active BWP, it is beneficial for the UE to switch to another BWP prior to triggering of an RLF. The UE initiates a RA on an inactive BWP which has Physical RACH (PRACH) resource configured. Upon reception of the RA, the gNB can decide if the UE needs to switch to another BWP. The gNB can reply with a downlink control information (DCI) message or an RRC reconfiguration indicating the new BWP which may be a different one from which the UE has transmitted the RA in. After switching to the new active BWP, the UE can reset the counter for LBT problem detection.

If the UE has detected LBT problems for all configured BWPs with RA configured, the UE may declare an RLF for the cell and trigger RRC connection reestablishment.

In case an RLF event is triggered, the UE would follow the existing RRC connection reestablishment procedure to recover from the failure.

For a UE configured with SCells, if the UE has detected consistent UL LBT failures in an SCell, the UE informs the gNB of the occurrence of the LBT failures, so the gNB takes appropriate recovery actions, for example, to order the UE to switch to another BWP in the SCell, or to inactivate or de-configure the cell where the UL LBT failures have been detected. When consistent uplink LBT failures are detected in an SCell, a new MAC Control Element (CE) to report this to the network node where SCell belongs to is defined. The new MAC CE (i.e., named as UL LBT failure MAC CE) can indicate the serving cell in which consistent UL LBT failures has been detected. The gNB knows in which BWP the UE is currently active and as a UE only has one active BWP per cell, upon reception of the MAC CE, the gNB can understand that the UE has experienced consistent UL LBT failures in its current active BWP in the indicated cell. The MAC CE format carries a bitmap field to indicate all the cells in which the UE has declared consistent UL LBT failures.

When consistent UL LBT failures are detected in a BWP of an SCell, the MAC entity will trigger am UL LBT failure Indication MAC CE. If there is an available UL grant in any serving cell for a new transmission, the UE will indicate to the Multiplexing and assembly entity to include an UL LBT failure MAC CE in the subsequent uplink transmission. If there is no UL grant available, the UE shall trigger a scheduling request for requesting a new UL resource for the MAC CE.

The MAC CE is also applicable to the primary cell (PCell or PSCell). In the primary cell, the UE switches to another BWP and initiates RACH upon declaration of consistent LBT failures. During the RACH procedure especially for a contention-based RA (CBRA) based procedure, the UE can include the MAC CE (e.g., UL LBT failure MAC CE) in Msg3 so that the gNB can identify the purpose why the RA has been triggered by the UE. When consistent uplink LBT failures are detected on the PSCell, the UE informs the master node (MN) via the SCG failure information procedure after detecting consistent UL LBT failures in all configured BWPs.

Figure 8:
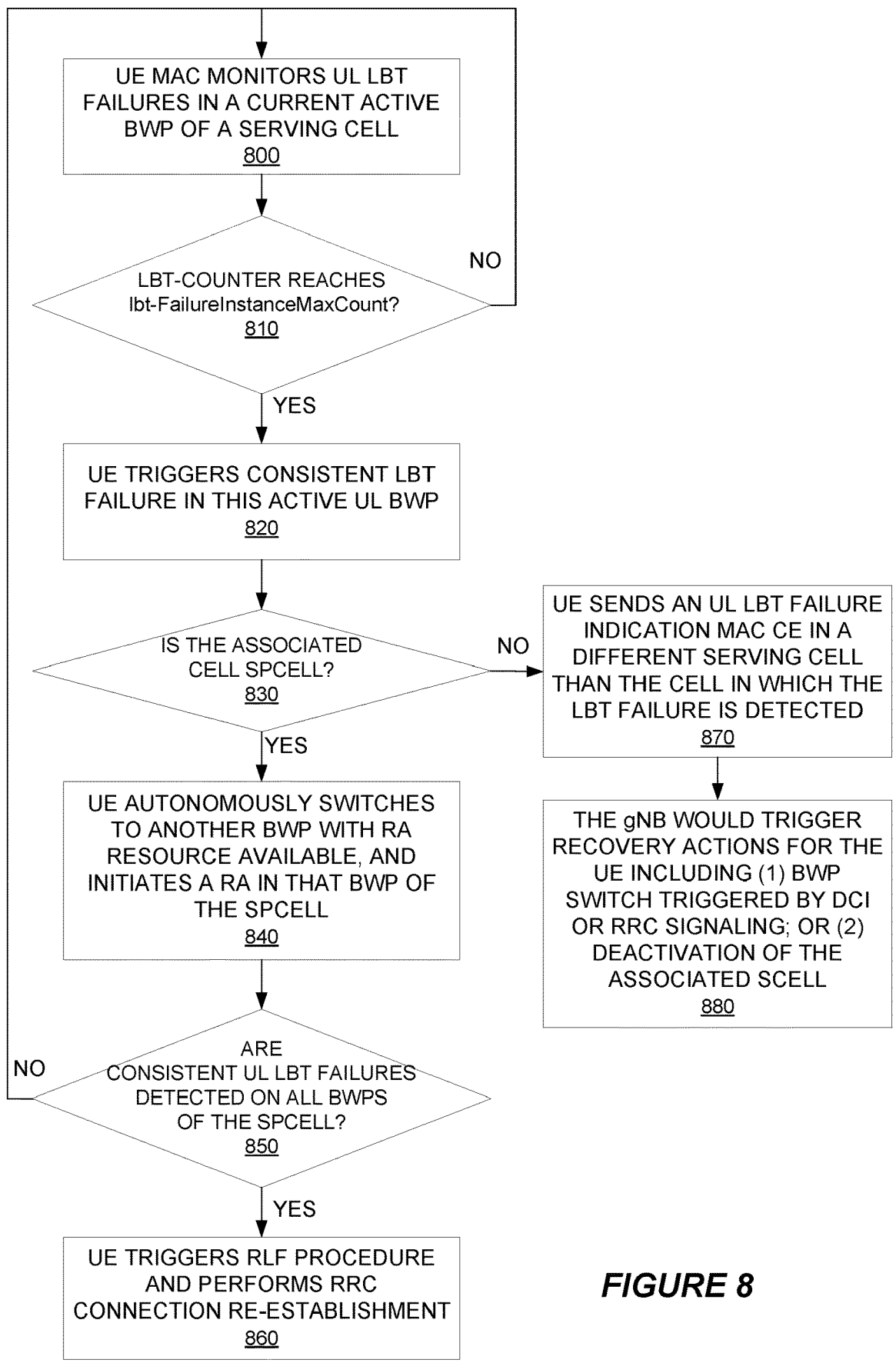
FIG. 8 is a logic flow diagram of a procedure for recovery from consistent uplink listen-before-talk failure according to some embodiments.

An example of the recovery procedure is illustrated in FIG. 8. As shown, the UE MAC monitors UL LBT failures in a current active BWP of a serving cell (Block 800). The UE MAC continues to do so until the counter LBT-COUNTER reaches Ibt-FailureInstanceMaxCount (YES at Block 810). When this happens, the UE triggers consistent LBT failure in this active UL BWP (Block 820). If the associated cell is not an SpCell (NO at Block 830), the UE sends an UL LBT failure indication in a MAC CE in a different serving cell than the cell in which the LBT failure is detected (Block 870). The gNB then triggers recovery actions for the UE, including (1) a BWP switch triggered by DCI or RRC signaling; or (2) deactivation of the associated Scell (Block 880). By contrast, if the associated cell is an SpCell (YES at Block 830), the UE autonomously switches to another BWP with a RA resource available, and initiates a RA in that BWP of the SpCell (Block 840). If consistent UL LBT failures are not detected on all BWPs of the SpCell (NO at Block 850), the UE repeats the above process for the new BWP to which the UE switched. But if consistent UL LBT failures are detected on all BWPs of the SpCell (YES at Block 850), the UE triggers the RLF procedure and performs RRC connection re-establishment (Block 860). For example, the RRC connection re-establishment may be performed as specified in the 3GPP spec 38.300 v 16.0.0 clause 9.2.3.3.

Some embodiments herein address certain challenge(s) in this context. The UL LBT failure handling mechanism is heretofore only applicable to a UE in RRC connected mode. In case of mobility procedures in RRC IDLE, RRC INACTIVE and RRC connection reestablishment, there is heretofore no valid LBT failure handling configuration for the target cell during the corresponding procedure. Hence, for the UE it would not be feasible to apply the existing LBT failure handling mechanism for those procedures.

For example, upon triggering of the procedure (i.e., upon initiating a Random Access Channel, RACH, procedure towards a selected target cell), the UE heretofore starts a timer. The timer will be stopped when the procedure is successfully completed. For example, upon triggering of a RRC connection reestablishment procedure, the UE starts a timer T311; the timer is stopped upon the UE selecting a suitable NR cell or a cell using another RAT. The timer is expired if the UE cannot complete the procedure successfully over a certain time period, at which point the UE enters RRC IDLE. However, the UE may experience consistent LBT failures during the mobility procedures triggered for a UE in RRC IDLE, RRC INACTIVE and RRC connection reestablishment. In this case, the UE would not be able to complete the procedure in time. Upon expiration of the timer, the UE would heretofore then switch to a state (such as RRC IDLE) where the UE would then have to spend a longer time to switch back to a state (such as RRC CONNECTED) where the UE can continue data transfer or reception more efficiently. This therefore may introduce unacceptable service interruption.

Certain aspects of the present disclosure and their embodiments may provide solutions to these or other challenges. Embodiments herein include mechanisms to address the issue that a UE may experience consistent LBT failures during a mobility procedure in RRC IDLE, RRC INACTIVE and RRC connection reestablishment.

In a FIRST embodiment, for example, the UE is configured to perform LBT failure detection and recovery for the target cell during the mobility procedure. The related configuration (e.g., as an example of configuration 24 in FIG. 1) may be signaled to the UE by the gNB via a RRC signaling, or a MAC CE or a DCI. Upon detection of consistent LBT failures in a target cell (e.g. cell1), the UE is triggered to select a new target cell (e.g. cell2) or triggered to reattempt on a different part (e.g. BWP) of the same target cell (e.g., up to a certain number of times and/or during a certain time period) after which the UE may select a new target cell.

In a SECOND embodiment, by contrast, the UE may not be specifically configured with LBT failure detection and/or recovery for the target cell during mobility procedures triggered for a UE in states (i.e., including RRC IDLE, RRC IACTIVE and RRC connection reestablishment). In this case, the UE may still effectively monitor the LBT failures in the target cell and solely rely on timers to react in case the UE has experienced consistent LBT failures in the procedure (e.g., the UE uses an existing timer if there is any).

Certain embodiments may provide one or more of the following technical advantage(s). The mobility procedure in RRC IDLE, RRC IACTIVE and RRC connection reestablishment is not stalled due to consistent LBT failure.

More particularly, in the FIRST embodiment, a UE is configured with LBT failure detection and recovery for a target cell during mobility procedures triggered for (or by) a UE in states (e.g., RRC IDLE, RRC INACTIVE and RRC connection reestablishment) where there is heretofore no valid LBT failure handling configuration for the target cell. The configuration (e.g., as an example of configuration 24 in FIG. 1) may be sent to the UE under those states via new signaling means (e.g., as an example of signaling 20 in FIG. 1) or be determined by the UE using one or more rules. The configuration may also indicate a list of cells or parts (e.g. BWPs) of one cell or more cells and frequencies for which e.g. resume/reestablishment should be attempted. In this case, for each cell and frequency, it may be indicated the maximum amount of time or maximum number of attempts or the maximum number of LBT failure events that can be experienced before the UE gives up with resume/reestablishment in that cell or in that part of the cell, or before giving up with the overall resume/reestablishment procedure. The configuration of the parts of one or more cells may be comprised in an UL resource configuration for UL transmission attempts, e.g., RA resources. The UL resource configuration may be provided proactively or upon detecting the failure in the UE. A part of a cell may comprise one or more of: a set of time resources, a set of frequency resources, a space (area) within the cell, a beam/direction, etc.

The configuration may also include at least one of the below mechanisms:
1) A counter for counting consecutive LBT failure occurrences.
2) One or several timers for detection of LBT failures.

In one example, when a maximum is exceeded (e.g., the number of attempts or LBT failures has reached a configured maximum number of the LBT failures or the maximum time period for the attempts expires), the UE declares an event of LBT failure, which further triggers the UE to perform a recovery action. In another example, when a maximum is exceeded (e.g., the number of attempts or LBT failures has reached a configured maximum number of the LBT failures or the maximum time period for the attempts expires), the UE attempts on another part of the cell; after trying all relevant parts of the cell and failing on all of them, the UE declares an event of LBT failure, which further triggers the UE to perform a recovery action. A relevant part of the cell can be any configured part of the cell or a selected by the UE part (e.g., autonomously or based on a pre-defined rule or based on a selection rule or sequence from a network node). The set of relevant parts may comprise all configured parts of the cell or a subset of parts of the cell. The maximum number of the relevant parts to be attempted by the UE can be pre-defined or configured by the network or can even be autonomously or based on a pre-defined rule decided by the UE.

In some embodiments, the UE monitors at least one of the below LBT failure occurrences.
1) LBT failures or the number of attempts for any uplink transmission
2) LBT failures for any downlink transmission
3) The time elapsed since the first UL transmission attempt
4) The time elapsed since the first DL reception attempt The timers for detection of LBT failures may comprise several timers for different purposes. In one example, a timer is introduced for monitoring the interval of two consecutive LBT failure instances. The timer is started and restarted whenever a failure instance is detected. When the timer is expired, the counter of LBT failures can be reset to zero. In another example, a timer is introduced to reflect the maximum time period for the UE to declare an event of LBT failure. The timer is started/restarted when the UE detects the first LBT failure instance during a period when consistent LBT failure instances are being detected. When the timer is expired, the UE can declare an event of LBT failure. The timer can be stopped in case the UE cannot detect consecutive LBT failure instances. All timers and counters may be stopped/reset in case the UE has recovered from the declared LBT failure event or the UE has received reconfiguration signalling for LBT failure detection and recovery.

The configuration of LBT failure detection and recovery can be signalled to the UE by the network node (e.g. base station, transmission point (TRP), gNB, eNB etc) in an RRC signalling message or it can be determined by the UE based on a pre-defined rule. The configuration may be not associated to a specific target cell; therefore, the configuration in this case will be applicable to any target cell during the subsequent cell section and reselection procedure. Alternatively, the configuration can be signalled to the UE via a MAC CE or DCI. Alternatively, the configuration can be signalled to the UE in the system information. For any above signalling means, they can be applied in a combined fashion. Alternatively, the UE can determine at least one parameter in the configuration based on a pre-defined rule, e.g., using the same parameter configuration as for LBT failure detection and recovery for the serving cell. As yet another alternative, the parameters may be hard-coded in a telecommunications (e.g., 3GPP) specification. In this case, the parameters may depend/be different depending on RRC procedure, RRC state, UE capability and cell type.

More specifically, for a mobility procedure triggered for a UE in RRC IDLE, it is preferred to send the configuration via the system information or a paging message, or a DCI associated to a common search space (e.g., such as a DCI addressed to Paging Radio network Temporary Identifier, P-RNTI). Alternatively, the configuration may be provided in a default configuration. As another alternative, the configuration may be signalled to a UE when the UE was in RRC connected mode. The UE can store the configuration and apply it when the UE goes into RRC IDLE.

For a mobility procedure triggered for a UE in RRC INACTIVE, it is preferred to send the configuration in an RRC reconfiguration which had instructed the UE to go to the RRC INACTIVE state. The UE can store the configuration and apply it when the UE goes into RRC INACTIVE.

For RRC reestablishment, it is preferred to send the configuration to the UE when the UE was in RRC connected mode. The UE can store the configuration and apply it when the UE goes into RRC IDLE or loses connection to the serving cell and re-establishes the connection to a cell of one the indicated carriers in the RRC connection reestablishment message.

For any of the above cases, the mentioned preferred signalling means is just an example. Any other signalling means is also applicable.

Alternatively, the UE may apply the LBT failure recovery configuration in a most recent serving cell (which was a most recent serving cell when the UE was in RRC connected) for the subsequent mobility procedure triggered when the UE is in RRC IDLE, RRC INACTIVE, RRC connection reestablishment.

Upon declaration of at least one LBT failure event, the UE can take at least one of below recovery actions. As a first action, the UE stops to access the currently selected target cell on the carrier.

As a second action, the UE selects another target cell to perform access. This cell may be on the same frequency as the previous cell in which a failure event has been declared. If there are multiple target cell candidates are available, the UE may follow a decreasing priority order to select cell.

As a third action, if the number of cells on the same frequency in which the UE has declared LBT failure event has reached a configured number (alternatively, a timer is introduced to limit the UE to select the cells on the same frequency), the carrier frequency can be barred for the UE for a configured time period. If a frequency is barred, the UE can switch to another carrier frequency to find suitable cell to access. Alternatively, the carrier frequency is not barred instead, it is down-prioritized for a configured time period. In one example where the priority of carriers is configured the UE may follow a decreasing priority order of the carrier to select a cell. In another example, the UE may autonomously select another carrier among the carriers configured by the network node for a certain procedure e.g. RRC re-establishment. The UE then detects a suitable cell on the selected carrier and if the cell is detected then the UE completes the procedure. If the procedure is not successfully completed (e.g. due to LBT failure event reaching a configured number) then the UE continues attempting to do so until the completion of the procedure or until it has attempted on all the configured carriers.

As a fourth action, the UE can select a target cell in another RAT and/or of another duplex mode, when the intra-RAT attempts have not become successful. For this, the UE would need a configuration also for the other RAT, similar to intra-RAT but the parameters can differ.

As soon as the UE has succeeded to access a target cell (i.e., when the UE has entered RRC_Connected), the LBT failure detection and recovery procedure is stopped. And all relevant timers and counters are reset. The UE may report at least one of below information to the gNB,
1) The carrier and the cells or cell parts in which the UE has experiences the failure event or declared events of LBT failures.
2) The latency or time that the UE has taken to enter RRC Connected since the UE receives the RRC release message In the SECOND embodiment, the UE may not be configured with LBT failure detection and recovery during mobility procedures triggered for a UE in states (i.e., including RRC IDLE, RRC INACTIVE and RRC connection reestablishment). In this case, the UE may still monitor the LBT failures in the target cell and solely rely on the timers to react in case the UE has experienced consistent LBT failures in the procedure (e.g., the UE uses an existing timer if there is any). There is an existing timer T311 for RRC connection reestablishment. However, there are heretofore no timers for mobility procedures triggered for a UE in RRC IDLE and RRC INACTIVE. Therefore, new timers are proposed herein, e.g., two new timers (e.g., named as T1 and T2, other names are equally applicable) need to be introduced. The example timers are listed in the below table. When to stop the timers are also proposed for the new timers.

| Timer | Start | Stop |
| --- | --- | --- |
| T1 (new) | Upon initiating the RRC connection establishment procedure. | Upon reception of RRCSetup or RRCReject message, cell re-selection and upon abortion of connection establishment by upper layers. |
| T311 (existing) | Upon initiating the RRC connection re-establishment procedure | Upon selection of a suitable NR cell or a cell using another RAT. |
| T2 (new) | Upon initiating the RRC Resume procedure. | Upon reception of RRCResume, RRCSetup, RRCRelease, RRCRelease with suspendConfig or RRCReject message, cell re-selection and upon abortion of connection establishment by upper layers. |

Here, the RRC connection establishment procedure and/or the RRC resume procedure may include not only the RRC signaling for connection establishment or resumption but also a random access procedure, e.g., as a prerequisite to the RRC signaling.

In some embodiments, one first timer can be defined for a given cell or cell part. While such first timer is running, in case the UE cannot access a selected target cell successfully within a configured time period (alternatively, a counter for RACH access attempts can be introduced), the UE can take e.g. at least one of below actions
1) The UE stops to access the currently selected target cell
2) The UE selects another target cell to perform access. This cell may be on the same frequency as the previous cell in which a failure event has been declared. If there are multiple target cell candidates are available, the UE may follow a decreasing priority order to select cell.

The UE can also attempt on another part of the cell, which may be controlled by the first timer associated with the cell or a separate per-part timer can be introduced or the first timer is applied for each cell part, and after all relevant parts are attempts without success the UE can select another target cell to perform access.

In another embodiment, a second timer is defined that when it has expired, the UE may perform below actions.
1) For mobility procedures triggered for UE in RRC IDLE
   The UE informs upper layers about the failure to establish the RRC connection, upon which the procedure ends
2) For mobility procedures triggered for UE in RRC INACTIVE
   The UE performs the actions upon going to RRC_IDLE as specified in clause 5.3.11 in the 3GPP TS 38.311 v16.0.0 with release cause 'RRC Resume failure'. Alternatively, a new cause is defined to indicate the occurrence of consistent LBT failure during RRC Resume.
3) For RRC connection reestablishment.
   The UE enters RRC_IDLE.

In addition, the carrier frequency and cells in which the UE has attempted can be barred for the UE for a configured time period, which can be pre-defined or configured by the network node (e.g. via RRC message). If a frequency is barred, the UE can switch to another carrier frequency to find a suitable cell to access. Alternatively, the carrier frequency is not barred. Instead, it is down-prioritized for a configured time period. In one example the UE may follow a decreasing priority order of the carriers to select cell. The indicated redirection carrier shall be of highest priority among all possible carrier frequencies. In another example the UE may autonomously select another carrier among the carriers configured by the network node for a certain procedure e.g. RRC re-establishment. The UE then detects a suitable cell on the selected carrier and if the cell is detected then the UE completes the RRC connection reestablishment procedure. If the RRC connection reestablishment procedure is not successfully completed (e.g. due to LBT failure event reaching a configured number) then the UE continues attempting to do so until the completion of the procedure or until it has attempted on all the configured carriers. The carrier selection may also be based on a pre-defined rule and/or apply only to carriers with specific characteristics.

In addition, the UE may also report one of below information to the gNB when the UE has later obtained the connection to the network,
1) The failure reason (e.g., failure reason of the procedure due to such as consistent LBT failures)
2) The carrier and the cells or parts of the cells in which the UE has failed to access.

As a third embodiment, in one example, whether or not a UE supports LBT failure detection and recovery during a mobility procedure in RRC IDLE, RRC INACTIVE and RRC connection reestablishment procedure can be configured per UE. In another example, whether or not a UE supports LBT failure detection and recovery in target cell during a mobility procedure in RRC IDLE, RRC INACTIVE and RRC connection reestablishment can be configured per frequency bands of the UE. In yet another example, whether or not a UE supports LBT failure detection and recovery during a mobility procedure in RRC IDLE, RRC INACTIVE and RRC connection reestablishment procedure can be configured per frequency range (FR) supported by the UE i.e. for all bands within certain FR. Examples of FR are FR1, FR2 etc. An example of FR1 is frequencies between 400 MHz and 7 GHz. An example of FR2 is frequencies between 24 GHz and 52.6 GHz. A UE capability may be introduced accordingly. The UE can indicate its capability to a network node, upon a request or in an unsolicited way, which will take this information into account and based on this will configure the UE for performing the corresponding mobility procedure in RRC_IDLE, RRC_INACTIVE, and for RRC connection reestablishment procedure.

Note that embodiments herein are applicable to both licensed and unlicensed operations (such as LAA/eLAA/feLAA/MuLteFire, and NR unlicensed operation (NR-U)). Here, LAA stands for Licensed Assisted Access, eLAA stands for enhanced LAA, and feLAA stands for Further eLAA. The term "an event of LBT failure" as used herein means an event that the UE has consistently detected LBT failure instances. If at least one event is declared, the UE may need to take recovery actions.

Figure 9:
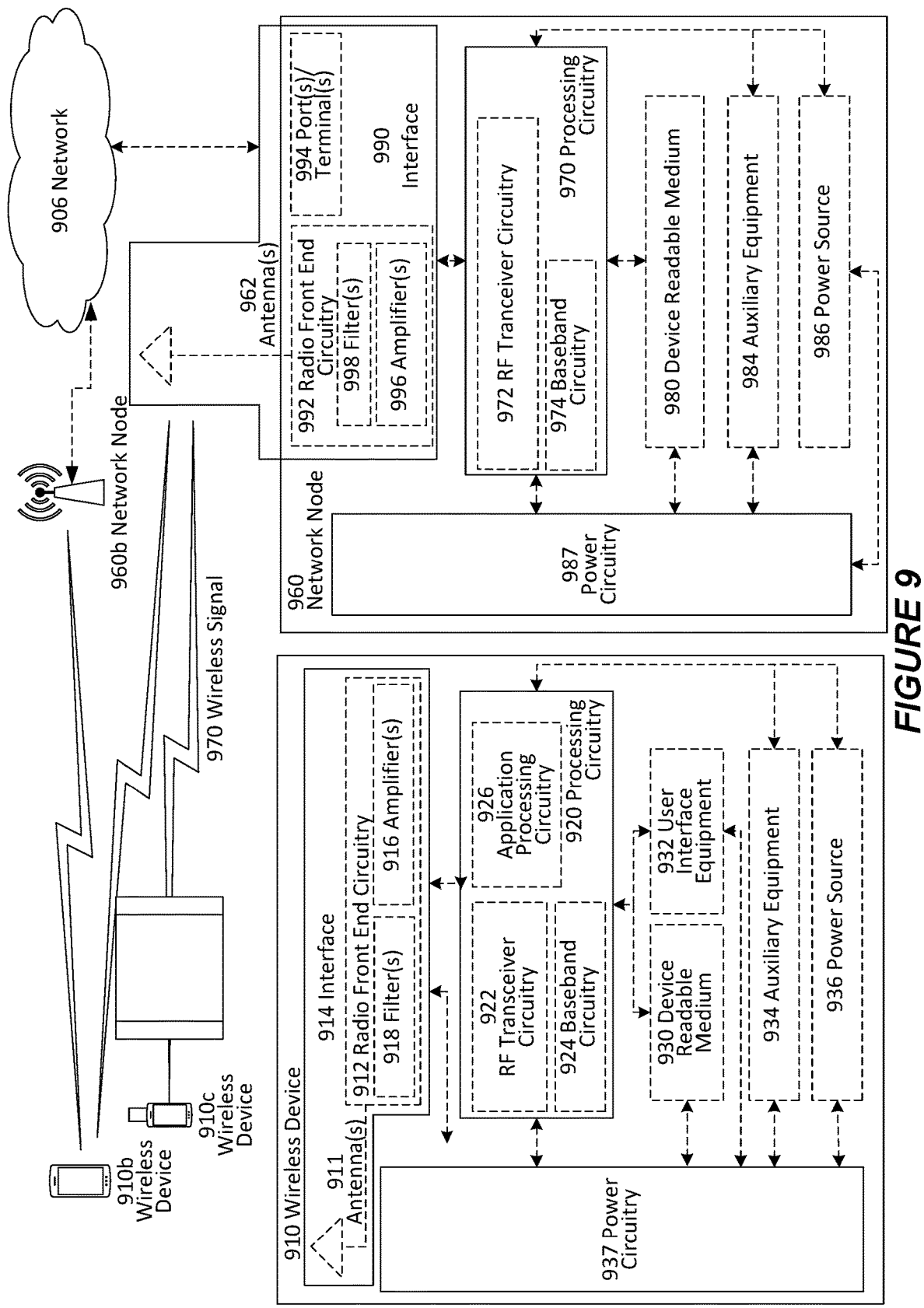
FIG. 9 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960b, and WDs 910, 910b, and 910c. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MM Es), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
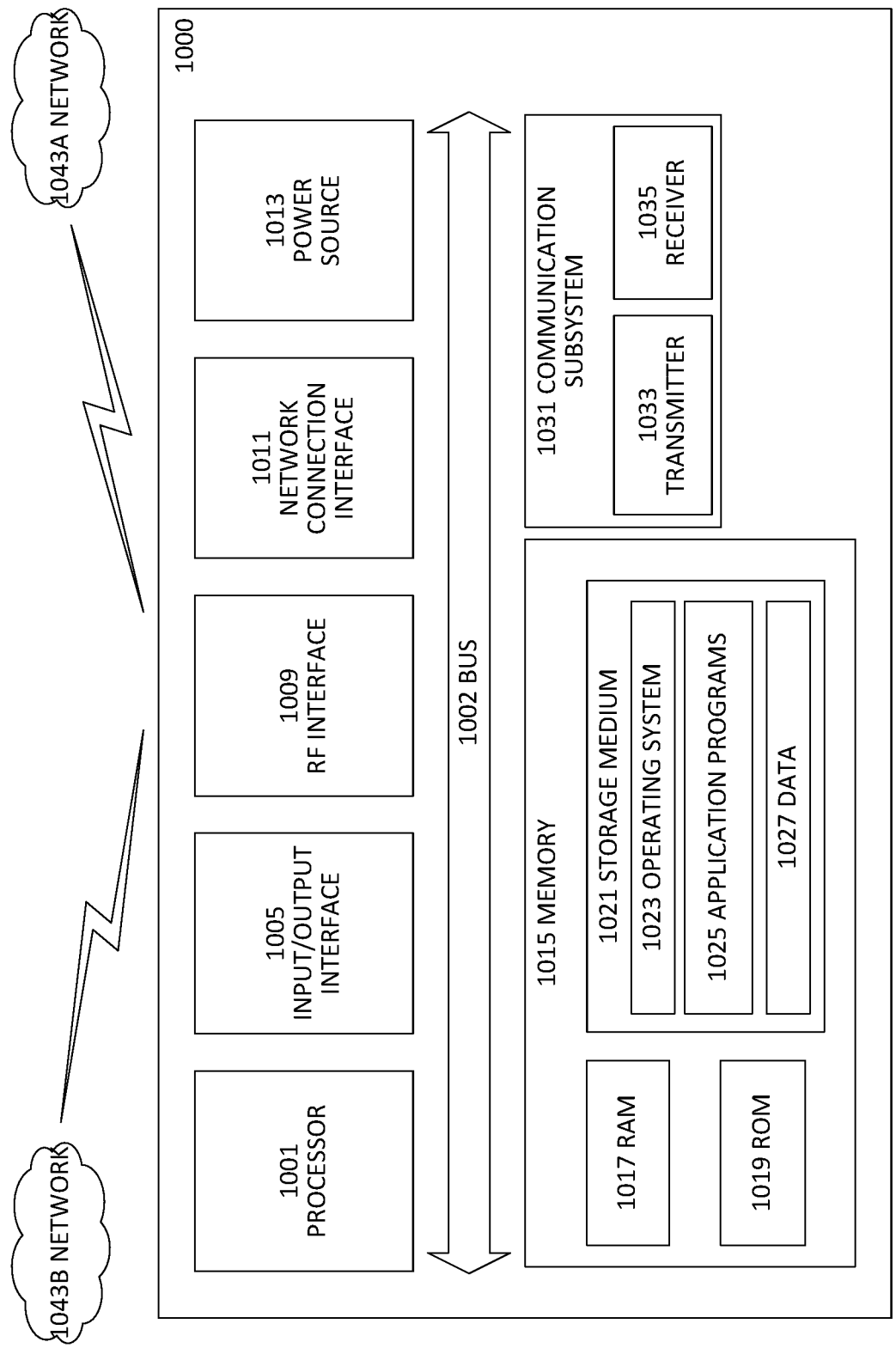
FIG. 10 is a block diagram of a user equipment according to some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 10200 may be any UE identified by the $3^{rd}$ Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043a. Network 1043a may encompass wired and/or wireless networks such as a local-area network (LAN), a wide-area network (WAN), a computer network, a wireless network, a telecommunications network, another like network or any combination thereof. For example, network 1043a may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043b using communication subsystem 1031. Network 1043a and network 1043b may be the same network or networks or different network or networks. Communication subsystem 1031 may be configured to include one or more transceivers used to communicate with network 1043b. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.10, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043b may encompass wired and/or wireless networks such as a local-area network (LAN), a wide-area network (WAN), a computer network, a wireless network, a telecommunications network, another like network or any combination thereof. For example, network 1043b may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
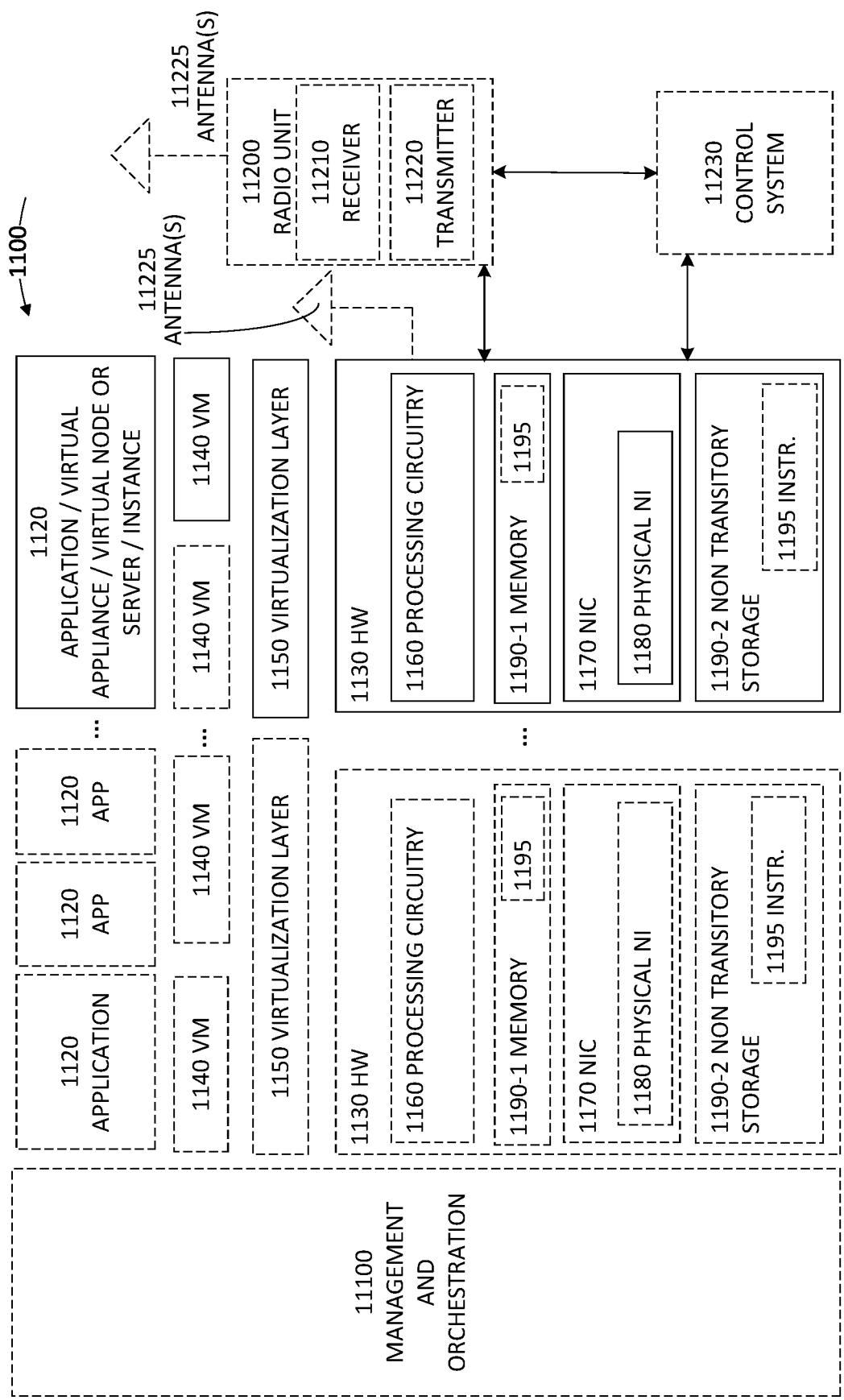
FIG. 11 is a block diagram of a virtualization environment according to some embodiments.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signalling can be effected with the use of control system 11230 which may alternatively be used for communication between the hardware nodes 1130 and radio units 11200.

Figure 12:
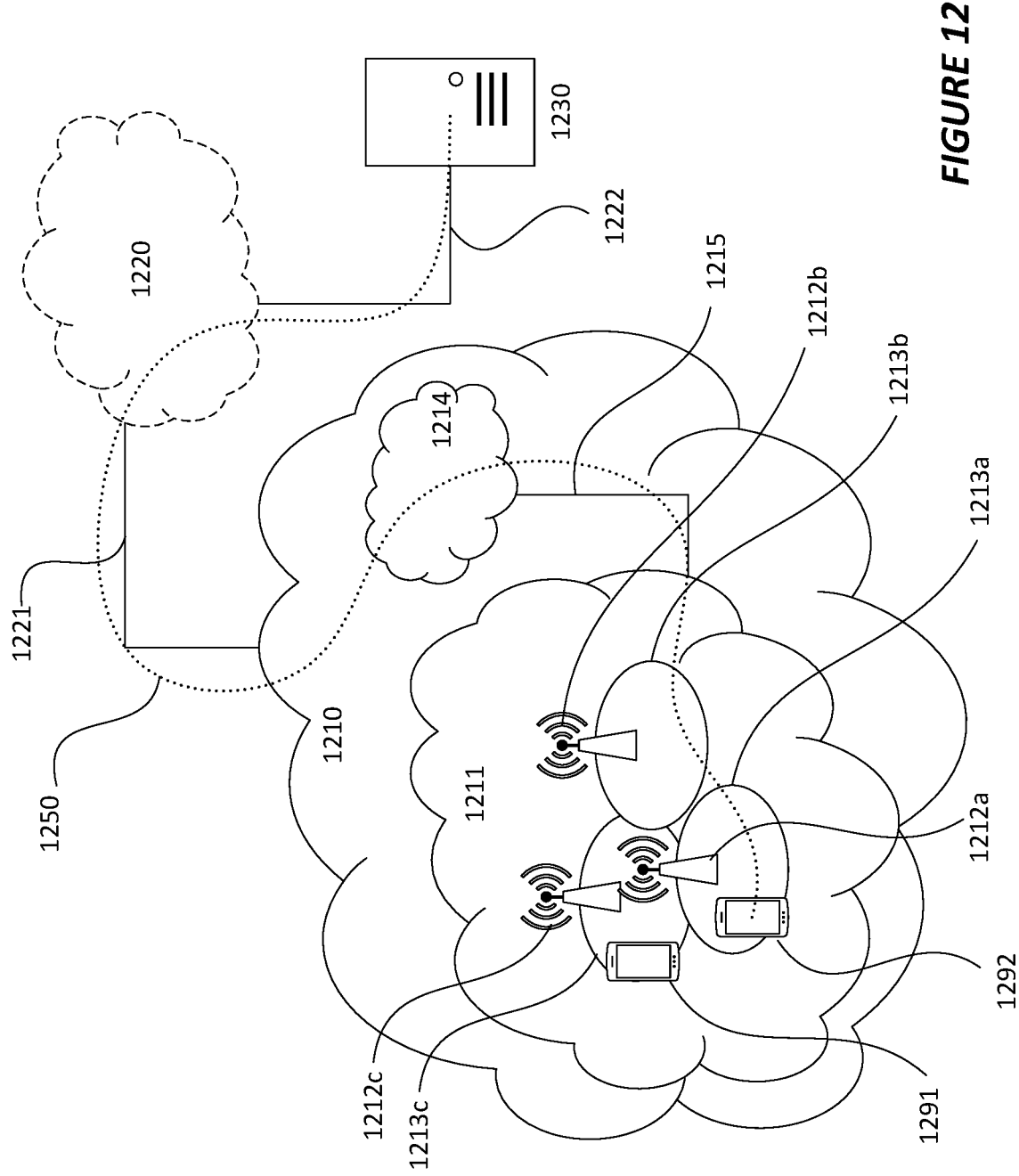
FIG. 12 is a block diagram of a communication network with a host computer according to some embodiments.

FIG. 12 illustrates a telecommunication network connected via an intermediate network to a host computer in accordance with some embodiments. In particular, with reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213*b*, 1213*c*. Each base station 1212*a*, 1212*b*, 1212*c* is connectable to core network 1214 over a wired or wireless connection 1215. A first UE 1291 located in coverage area 1213*c* is configured to wirelessly connect to, or be paged by, the corresponding base station 1212*c*. A second UE 1292 in coverage area 1213*a* is wirelessly connectable to the corresponding base station 1212*a*. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Figure 13:
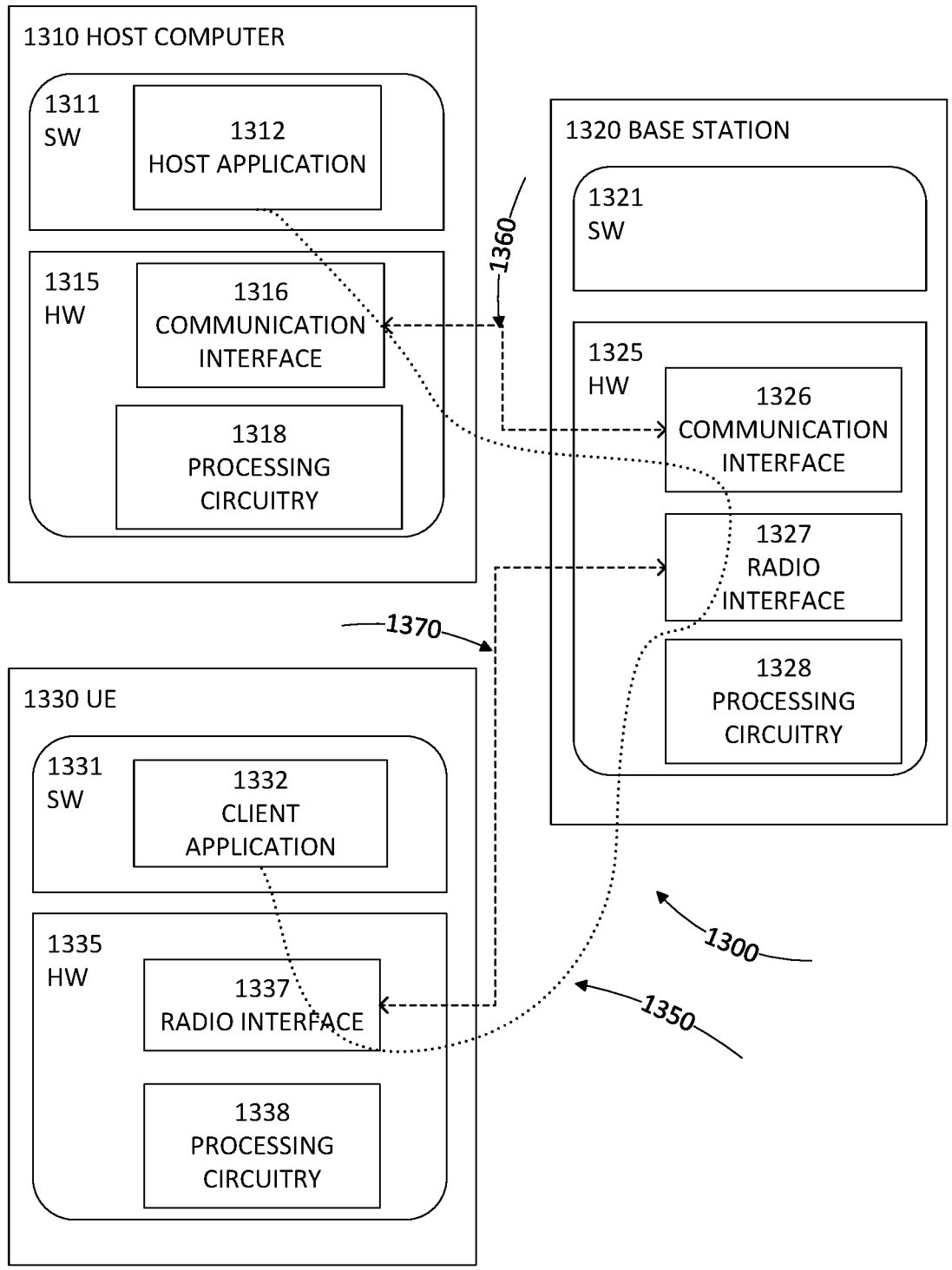
FIG. 13 is a block diagram of a host computer according to some embodiments.

Example implementations, in accordance with an embodiment, of the UE, base station and host computer discussed in the preceding paragraphs will now be described with reference to FIG. 13. FIG. 13 illustrates host computer communicating via a base station with a user equipment over a partially wireless connection in accordance with some embodiments In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212*a*, 1212*b*, 1212*c* and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
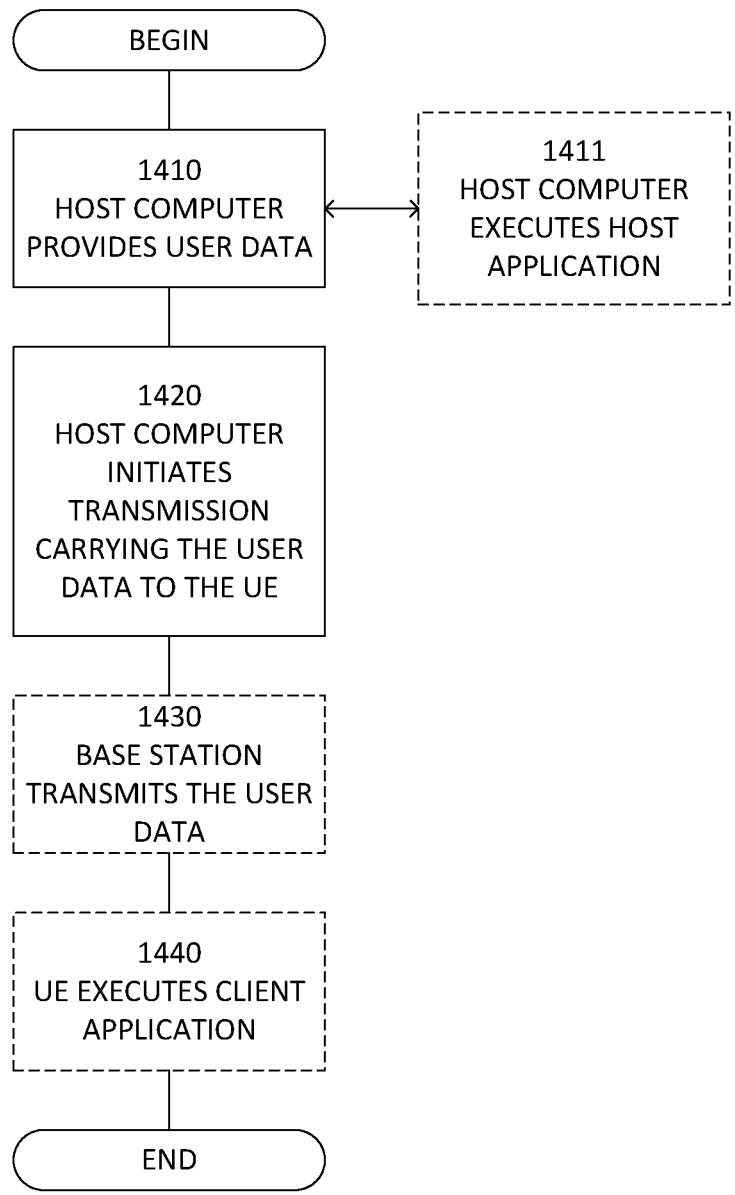
FIG. 14 is a flowchart illustrating a method implemented in a communication system, in accordance with one embodiment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
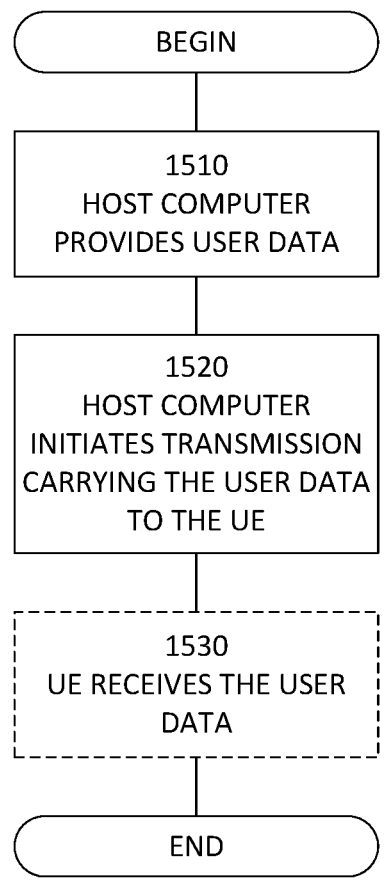
FIG. 15 is a flowchart illustrating a method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
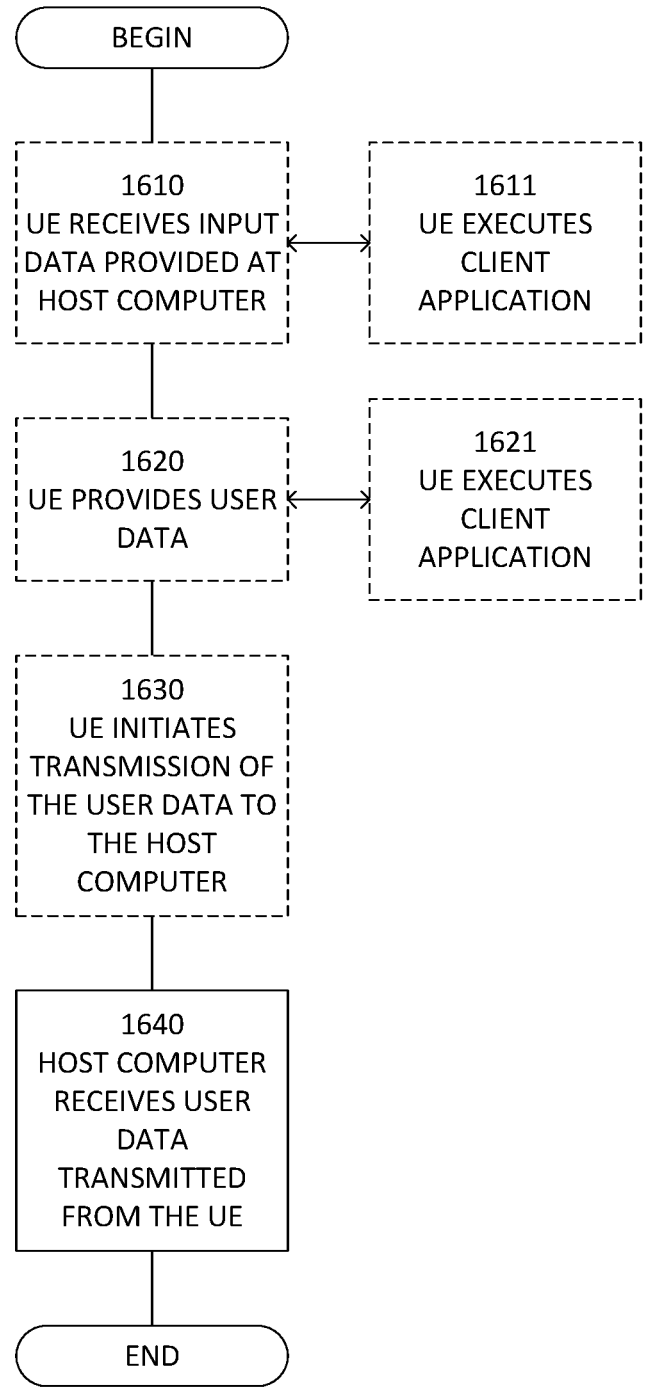
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
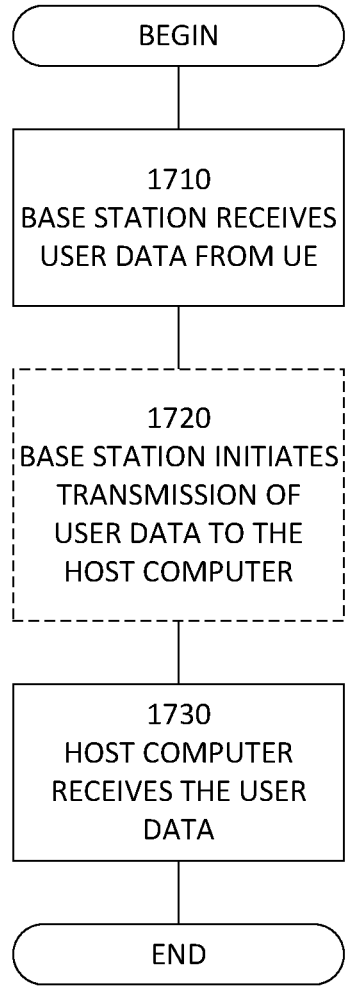
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a wireless device configured for use in a wireless communication network, the method comprising:
obtaining a configuration that governs how the wireless device is to monitor for or attempt to recover from consistent uplink listen-before-talk (LBT) failure that occurs during a mobility procedure triggered by the wireless device; and
according to the obtained configuration, monitoring for or attempting to recover from consistent uplink LBT failure occurring during the mobility procedure, wherein obtaining the configuration comprises receiving, from a network node, signaling indicating at least a part of the configuration, and wherein the signaling is received while the wireless device is in Radio Resource Control (RRC) connected mode.

2. The method of claim 1, wherein the mobility procedure comprises:
cell selection, or cell reselection, while the wireless device is in a Radio Resource Control (RRC) idle mode;
cell reselection, while the wireless device is in a Radio Resource Control (RRC) inactive mode; or
RRC connection re-establishment while the wireless device is in the RRC connected mode.

3. The method of claim 1, wherein the signaling is received while the wireless device is in an RRC idle mode or an RRC inactive mode.

4. The method of claim 1, wherein the method further comprises storing the configuration for use while the wireless device is in an RRC idle mode or an RRC inactive mode.

5. The method of claim 1, wherein the signaling indicates at least a part of the configuration in system information, or the signaling comprises cell-common signaling that is commonly sent to multiple wireless devices in a source cell or a target cell of the mobility procedure.

6. The method of claim 1, wherein obtaining the configuration comprises determining at least a part of the configuration from one or more rules, wherein said determining is based on a type of the mobility procedure, an RRC state of the wireless device, a capability of the wireless device, or a type of a target cell of the mobility procedure.

7. The method of claim 1, wherein the configuration indicates one or more cells, or one or more parts of a cell, towards which the wireless device is to attempt the mobility procedure in order to recover from consistent uplink LBT failure detected when attempting the mobility procedure towards a target cell.

8. The method of claim 1, wherein the configuration indicates one or more counters or one or more timers that the wireless device is to use for detecting consistent uplink LBT failure.

9. The method of claim 1, wherein the configuration is specific to an RRC state of the wireless device, or specific to a frequency band or range in which the wireless device is operating.

10. The method of claim 1, further comprising:
responsive to failing to recover from consistent uplink LBT failure, considering radio link failure to be detected; and
responsive to radio link failure being detected, transmitting a request for connection re-establishment, wherein the request indicates a cause of the request for connection re-establishment as being consistent uplink LBT failure.

11. The method of claim 1, further comprising reporting, to the wireless communication network, failure of the mobility procedure due to consistent uplink LBT failure.

12. A method performed by a radio network node configured for use in a wireless communication network, the method comprising:

transmitting, to a wireless device, signaling indicating at least part of a configuration that governs how the wireless device is to monitor for or attempt to recover from consistent uplink listen-before-talk (LBT) failure that occurs during a mobility procedure triggered by the wireless device, wherein the signaling is transmitted while the wireless device is in a Radio Resource Control (RRC) connected mode wherein the configuration is valid for use while the wireless device is in RRC idle mode or RRC inactive mode.

13. The method of claim 12, wherein the mobility procedure comprises:
cell selection, or cell reselection, while the wireless device is in a Radio Resource Control (RRC) idle mode;
cell reselection, while the wireless device is in a Radio Resource Control (RRC) inactive mode; or
RRC connection re-establishment while the wireless device is in the RRC connected mode.

14. The method of claim 12, wherein the signaling is transmitted while the wireless device is in RRC idle mode or RRC inactive mode.

15. The method of claim 12, wherein the signaling indicates at least a part of the configuration in system information, or the signaling comprises cell-common signaling that is commonly sent to multiple wireless devices in a source cell or a target cell of the mobility procedure.

16. The method of claim 12, wherein the configuration is based on or depends on a type of the mobility procedure, an RRC state of the wireless device, a capability of the wireless device, or a type of a target cell of the mobility procedure.

17. The method of claim 12, wherein the configuration indicates one or more cells, or one or more parts of a cell, towards which the wireless device is to attempt the mobility procedure in order to attempt to recover from consistent uplink LBT failure detected when attempting the mobility procedure towards a target cell.

18. The method of claim 12, wherein the configuration indicates one or more counters or one or more timers that the wireless device is to use for detecting consistent uplink LBT failure.

19. The method of claim 12, wherein the configuration is specific to an RRC state of the wireless device, or specific to a frequency band or range in which the wireless device is operating.

20. The method of claim 12, further comprising receiving a request for connection re-establishment, wherein the request indicates a cause of the request for connection re-establishment as being consistent uplink LBT failure.

21. The method of claim 12, further comprising receiving, from the wireless device, a report of failure of the mobility procedure due to consistent uplink LBT failure.

22. A wireless device configured for use in a wireless communication network, the wireless device comprising:
communication circuitry; and
processing circuitry configured to:
obtain a configuration that governs how the wireless device is to monitor for or attempt to recover from consistent uplink listen-before-talk (LBT) failure that occurs during a mobility procedure triggered by the wireless device; and
according to the obtained configuration, monitor for or attempt to recover from consistent uplink LBT failure occurring during the mobility procedure, wherein obtaining of the configuration comprises receiving, from a network node, signaling indicating at least a part of the configuration, and wherein the signaling is received while the wireless device is in Radio Resource Control (RRC) connected mode.

23. A radio network node configured for use in a wireless communication network, the radio network node comprising:
communication circuitry; and
processing circuitry configured to transmit, to a wireless device, via the communication circuitry, signaling indicating at least a part of a configuration that governs how the wireless device is to monitor for or attempt to recover from consistent uplink listen-before-talk (LBT) failure that occurs during a mobility procedure triggered by the wireless device, wherein the signaling is transmitted while the wireless device is in a Radio Resource Control (RRC) connected mode.

* * * * *